United States Patent
Tomitsuka et al.

(10) Patent No.: US 11,336,317 B2
(45) Date of Patent: May 17, 2022

(54) RADIO COMMUNICATION SYSTEM, INTERFERENCE SUPPRESSION METHOD, CONTROL CIRCUIT, AND PROGRAM STORAGE MEDIUM

(71) Applicant: MITSUBISHI ELECTRIC CORPORATION, Tokyo (JP)

(72) Inventors: Koji Tomitsuka, Tokyo (JP); Masatsugu Higashinaka, Tokyo (JP); Hiroyasu Sano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/962,964

(22) PCT Filed: Feb. 27, 2018

(86) PCT No.: PCT/JP2018/007332
§ 371 (c)(1),
(2) Date: Jul. 17, 2020

(87) PCT Pub. No.: WO2019/167140
PCT Pub. Date: Sep. 6, 2019

(65) Prior Publication Data
US 2021/0135698 A1 May 6, 2021

(51) Int. Cl.
*H04B 1/10* (2006.01)
*H04B 1/04* (2006.01)

(52) U.S. Cl.
CPC ......... *H04B 1/1027* (2013.01); *H04B 1/0475* (2013.01)

(58) Field of Classification Search
CPC ............................ H04B 1/1027; H04B 1/0475
(Continued)

(56) References Cited

U.S. PATENT DOCUMENTS 6,384,773 B1 * 5/2002 Martin .................... G01S 7/282
342/159
6,501,804 B1 12/2002 Rudolph et al.
(Continued)

FOREIGN PATENT DOCUMENTS

JP 2001-504291 A 3/2001
JP 2002-164801 A 6/2002
(Continued)

OTHER PUBLICATIONS

International Search Report, issued in PCT/JP2018/007332, dated May 15, 2018.
(Continued)

*Primary Examiner* — Kevin M Burd
(74) *Attorney, Agent, or Firm* — Birch, Stewart, Kolasch & Birch, LLP

(57) ABSTRACT

A radio communication system according to the present invention is a radio communication system including a transmission device and a reception device, the transmission device includes a first null insertion unit that inserts a first signal that is a signal having an electric power lower than an amplitude of the data symbols, in a time direction of data symbols, and the reception device includes a null extraction unit that extracts a first symbol that is a signal in a period corresponding to the first signal, from a received signal, a signal interpolation unit that interpolates the first symbol to reproduce interference components in periods corresponding to the data symbols, and a subtraction unit that subtracts the interference components from the received signal.

43 Claims, 20 Drawing Sheets

(58) Field of Classification Search
USPC .......................................................... 375/285
See application file for complete search history.

(56) References Cited

U.S. PATENT DOCUMENTS

| | | |
|---|---|---|
| 2002/0064234 A1 | 5/2002 | Kaku et al. |
| 2003/0002590 A1* | 1/2003 | Kaku ..................... H04B 1/123 |
| | | 375/285 |
| 2010/0048151 A1* | 2/2010 | Hara ..................... H04J 11/0056 |
| | | 455/115.1 |
| 2019/0190671 A1* | 6/2019 | Pingping ............... H04L 25/022 |

FOREIGN PATENT DOCUMENTS

| | | |
|---|---|---|
| JP | 2003-8521 A | 1/2003 |
| JP | 4195346 B2 | 12/2008 |
| JP | 2016-58828 A | 4/2016 |

OTHER PUBLICATIONS

Notification of Reason for Refusal for Japanese Patent Application No. 2020-503136, dated Mar. 31, 2020.

* cited by examiner

FIG.10
(a)
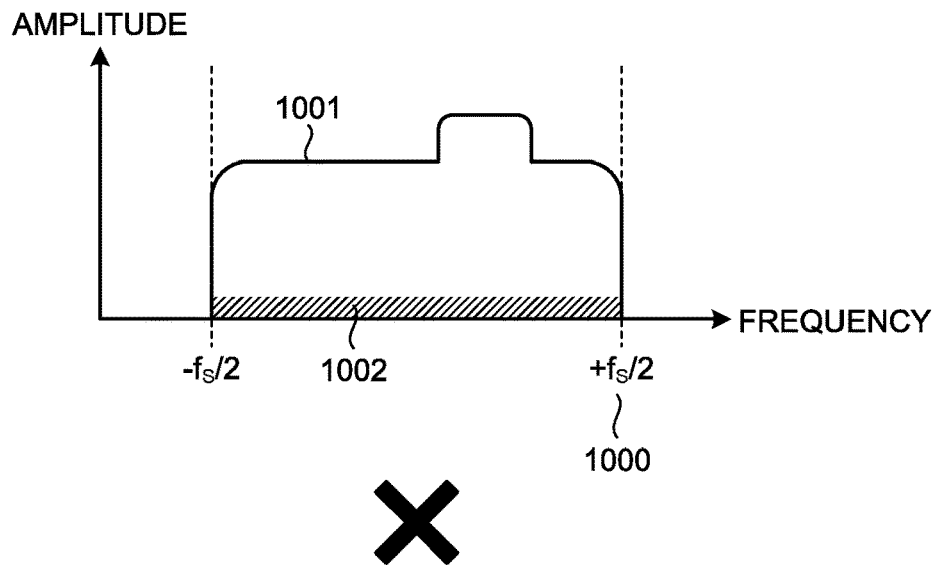
(b)
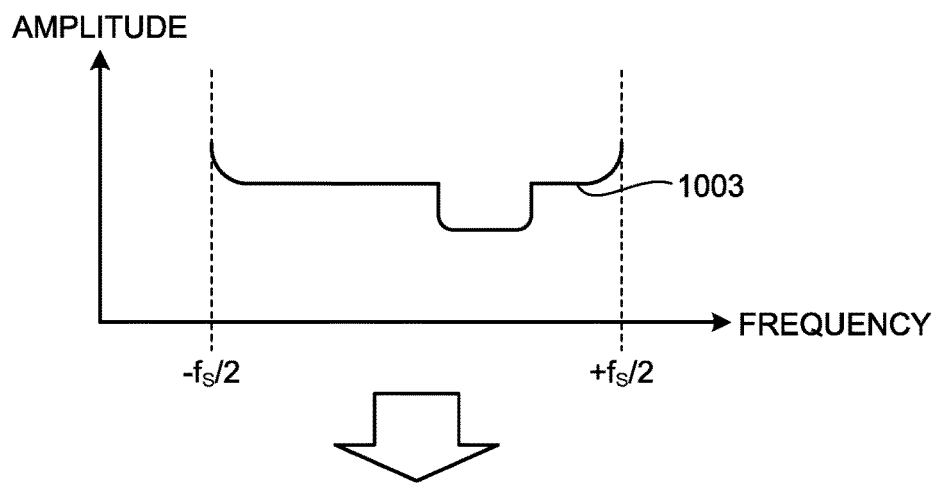
(c)
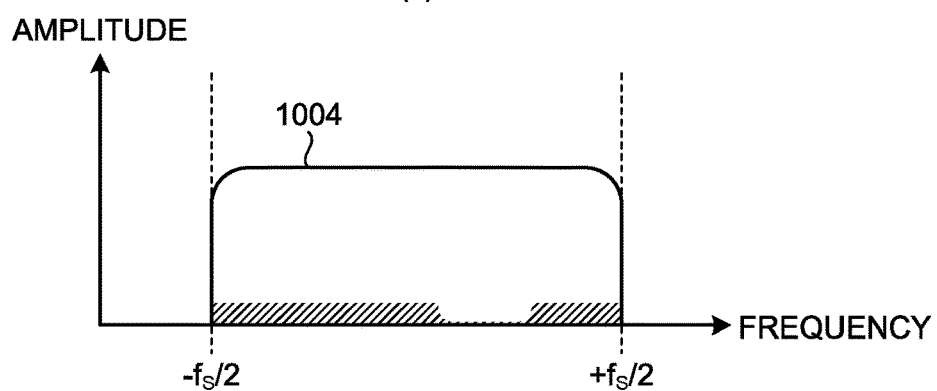

FIG.14
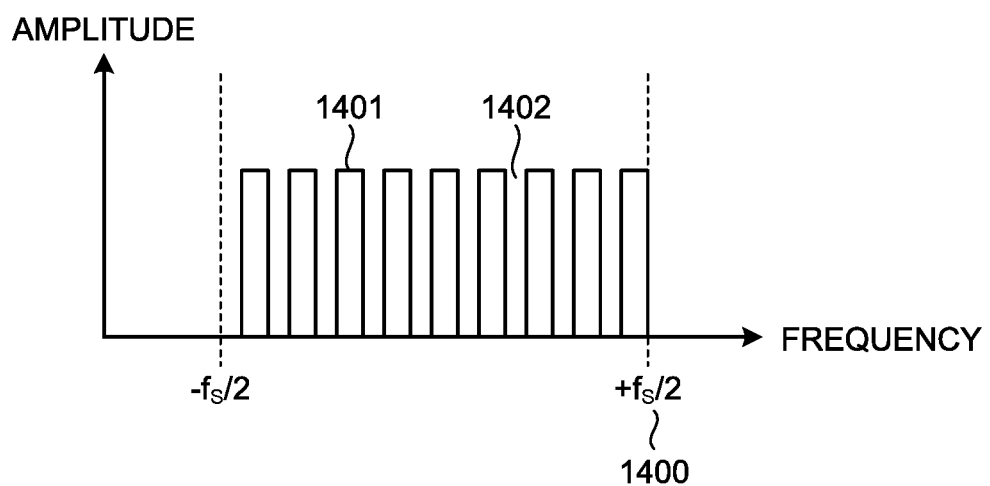
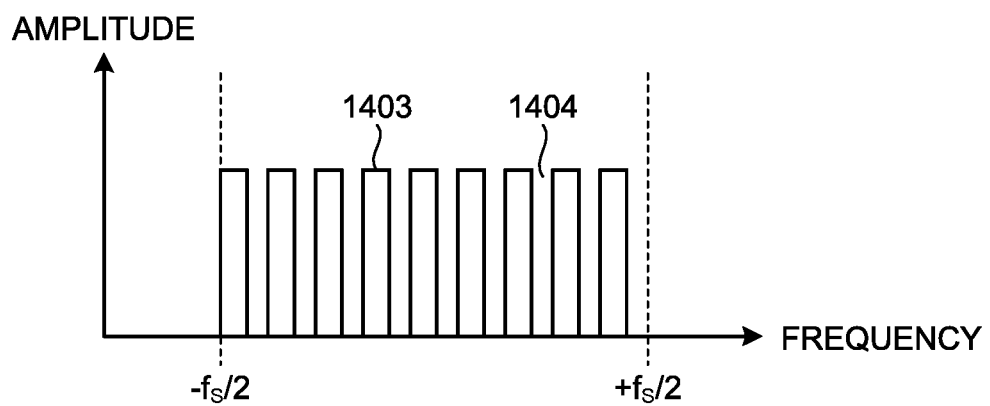

FIG.16
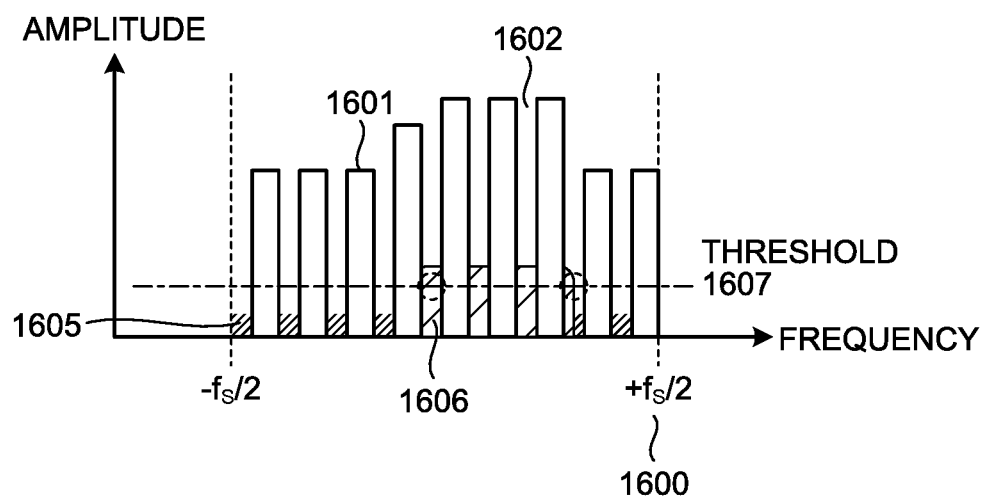
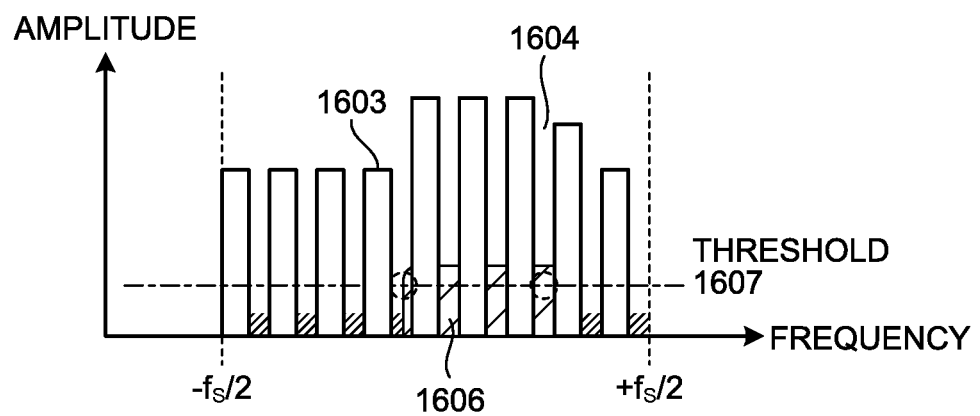

FIG.17
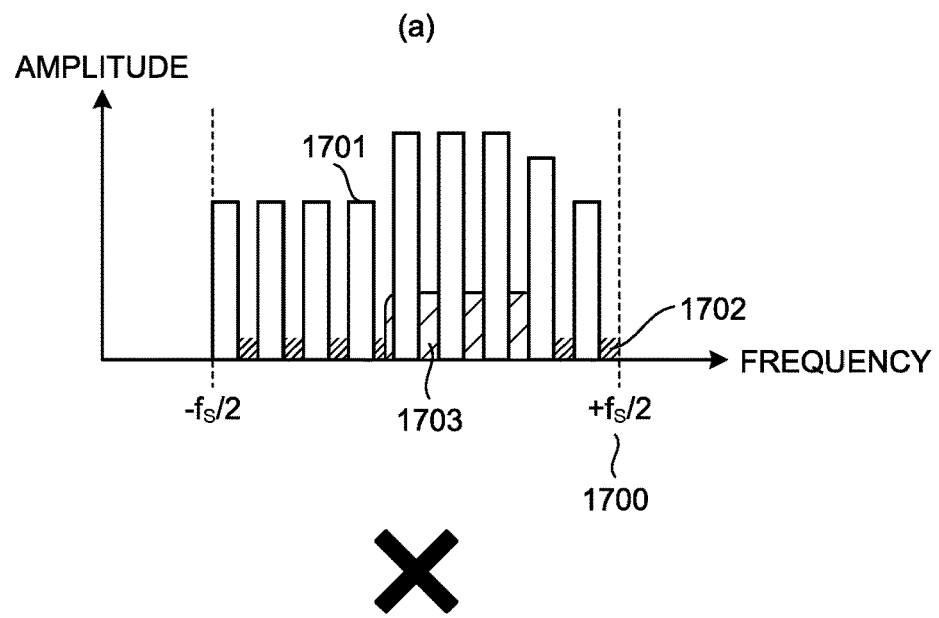
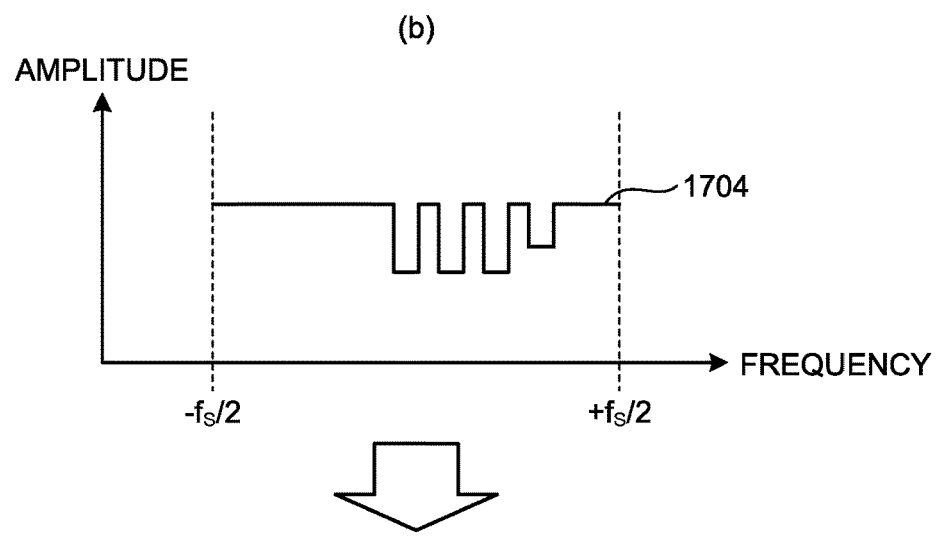
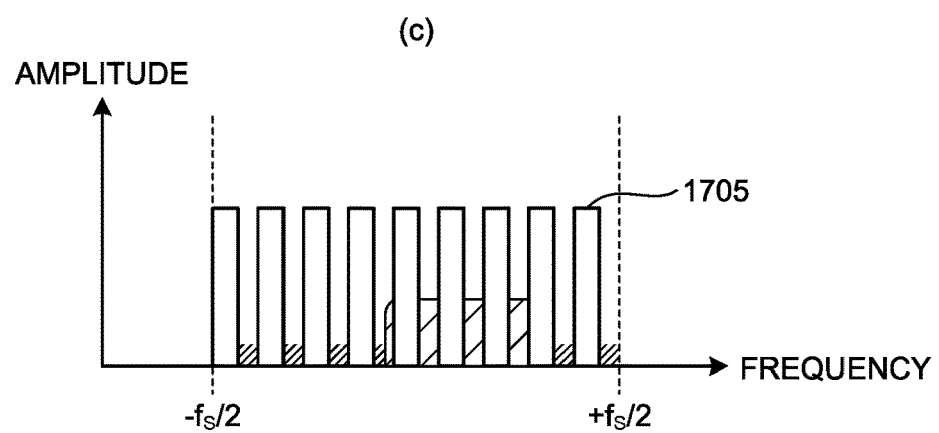

RADIO COMMUNICATION SYSTEM, INTERFERENCE SUPPRESSION METHOD, CONTROL CIRCUIT, AND PROGRAM STORAGE MEDIUM

FIELD

The present invention relates to a radio communication system that suppresses interference waves, and an interference suppression method for suppressing interference waves.

BACKGROUND

In a radio communication system constituted by a reception device and a transmission device, if an interference wave including some interfering wave is mixed included in the same frequency band as a frequency band of a desired wave, unignorable deterioration in quality of a reception signal received by the reception device is caused by the influence of the interference wave. Patent Literature 1 discloses a signal detection device capable of detecting a desired wave even when the electric power of an interference wave is greater than the electric power of the desired wave by demodulating a main signal having a higher power among reception signals to generate a replica of the main signal using the demodulation result of the main signal, and removing the replica from the reception signals.

CITATION LIST

Patent Literature

Patent Literature 1: Japanese Patent Application Laid-open No. 2016-58828

SUMMARY

Technical Problem

When generating a replica from the result of demodulation of the main signal, however, the signal detection device described in Patent Literature 1 cannot generate the replica with high accuracy unless specifications including the modulation method, the carrier frequency, and the like of the main signal that is an interference wave are known. In a case where an interference wave occurs in another radio communication system or an interference wave is an intentional jamming or interfering wave, it is difficult for a radio communication system to obtain specifications of the interference wave such as electric power thereof in advance. There has been a problem in that, when such an interference wave is included in a received signal, a radio communication system cannot remove the interference wave with high accuracy, and the reception quality of a desired wave is deteriorated.

The present invention has been made in view of the above circumstances, and an object thereof is to provide a radio communication system that prevents deterioration in reception quality of a desired wave.

Solution to Problem

In order to solve the above-mentioned problem and achieve the object, the present invention provides a radio communication system comprising: a transmission device; and a reception device, wherein the transmission device includes: a first null insertion unit to insert a first signal in a time direction of data symbols, the first signal being a signal having an electric power lower than an amplitude of the data symbols, and the reception device includes: a null extraction unit to extract a first symbol from a received signal, the first symbol being a signal in a period corresponding to the first signal; a signal interpolation unit to interpolate the first symbol to reproduce interference components in periods corresponding to the data symbols; and a first subtraction unit to subtract the interference components from the received signal.

Advantageous Effects of Invention

According to the present invention, an advantageous effect is produced, in which an interference suppression method for preventing deterioration in reception quality of a desired wave can be realized.

BRIEF DESCRIPTION OF DRAWINGS

FIG. 10 illustrates a chart illustrating an operation of a weight calculation unit and a spectrum flattening unit according to the third embodiment.

FIG. 14 illustrates a chart illustrating transmission spectra at a frequency null insertion unit according to the fifth embodiment.

FIG. 16 is a chart illustrating an operation of an interference estimation unit according to the fifth embodiment.

FIG. 17 illustrates a chart illustrating an operation of a spectrum flattening process according to the fifth embodiment.

DESCRIPTION OF EMBODIMENTS

A radio communication system and an interference suppression method according to embodiments of the present invention will be described in detail below with reference to the drawings. Note that the present invention is not necessarily limited to these embodiments.

First Embodiment

Figure 1:
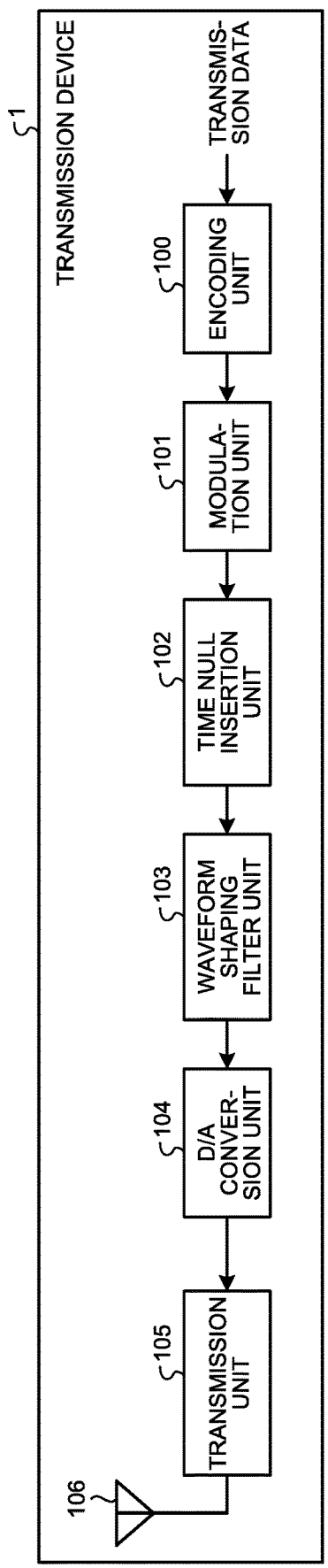
FIG. 1 is a diagram illustrating functional blocks of a transmission device according to a first embodiment.

A radio communication system includes a transmission device and a reception device. The transmission device and the reception device are separate devices, and the transmission device transmits signals to the reception device to perform communication. FIG. 1 is a diagram illustrating functional blocks of the transmission device according to a first embodiment. A transmission device 1 includes an encoding unit 100, a modulation unit 101, a time null insertion unit 102, a waveform shaping filter unit 103, a digital-to-analog (D/A) conversion unit 104, a transmission unit 105, and an antenna 106.

The encoding unit 100 performs error correction coding on transmission data. Examples of the error correction coding include convolutional coding, turbo coding, and low density parity check (LDPC). The error correction coding applied in the present invention, however, is not limited to these examples. In addition, the transmission device 1 may have a configuration in which the error correction coding is not performed. The modulation unit 101 performs primary modulation on transmission data to convert the transmission data into a transmission symbol sequence. Examples of the modulation method used for the primary modulation include phase shift keying (PSK), frequency shift keying (FSK), and quadrature amplitude modulation (QAM). The modulation method applied in the present invention, however, is not limited to these examples. The time null insertion unit 102 inserts a null period in a time domain of the transmission symbol sequence. Null is a signal whose amplitude is 0. Details of the time null insertion unit 102 will be described later. The time null insertion unit 102 will also be referred to as a first null insertion unit.

The waveform shaping filter unit 103 upsamples the transmission symbol sequence. The waveform shaping filter unit 103 also limits the band of the transmission symbol sequence, and generates a baseband signal or a transmission digital signal that is an intermediate-frequency (IF) signal. Although the type of a band-limiting filter used for the waveform shaping filter unit 103 to limit the band of the transmission symbol sequence is not particularly limited, application of a Nyquist filter is effective to prevent inter-symbol interference between a null period and a data period during band limitation. The D/A conversion unit 104 converts a transmission digital signal into a transmission analog signal. The transmission unit 105 converts the transmission analog signal obtained by the D/A conversion into a radio-frequency signal. The antenna 106 transmits the radio-frequency signal. Note that the processes for transmission performed by the time null insertion unit 102 and subsequent units are processes performed by a typical radio transmission device, and are not particularly intended to limit the present invention.

Details of the operation of the time null insertion unit 102 according to the first embodiment will now be explained. The transmission symbol sequence is inputted to the time null insertion unit 102. The time null insertion unit 102 inserts a null period between symbols in the time direction. Although the time length of one null period inserted between the symbols is not particularly intended to limit the embodiment, the time length of a null period is assumed to be equal to the time length of a symbol period for description in the first embodiment.

Figure 2:
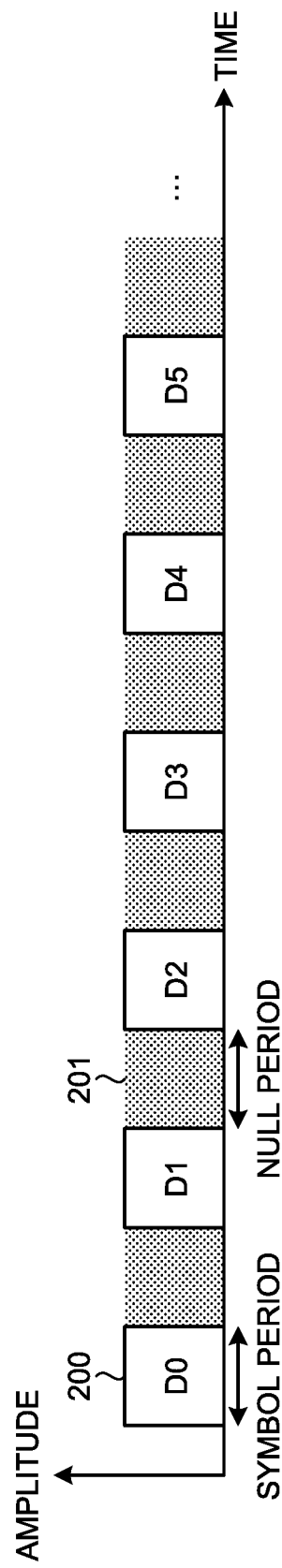
FIG. 2 is a diagram illustrating a transmission symbol sequence outputted by a time null insertion unit according to the first embodiment.

FIG. 2 is a diagram illustrating a transmission symbol sequence outputted by the time null insertion unit 102 according to the first embodiment. In FIG. 2, the horizontal axis represents time, and the vertical axis represents the amplitude of the signal. As illustrated in FIG. 2, the time null insertion unit 102 inserts a null period 201 between transmission symbol data sets 200. FIG. 2 illustrates an example in which one null period is inserted in each intermediate part between symbols. An interval at which null periods are inserted may, however, be set on voluntary basis, and the interval may be such that a null period is inserted between sets each having two or more symbols. In addition, the intervals for inserting the null periods need not necessarily be equal. In addition, a null period may be inserted periodically.

The time null insertion unit 102 is capable of adjusting the rate of null insertion in a transmission symbol sequence to any rate by adjusting the null insertion interval. The null insertion interval and the null insertion rate can be changed depending on the reception state of an interference wave at the reception device regardless of the communication state about whether it is in process of communication or stoppage of waves. For example, the null insertion interval may be shorter as the frequency range of interference waves included within the band of a desired wave of a received signal is wider. Alternatively, for example, the null period may be inserted while the null insertion interval is shortened for part of the transmission symbol sequence for which the interference immunity is to be particularly improved, and the null insertion rate may thus be changed. Still alternatively, for example, such control of the null insertion interval and the null insertion rate as inserting no null in the case where no influence of interference waves is present may be performed. In a case where the transmission device 1 operates in view of the influence of interference waves on the reception device, control for providing feedback of interference conditions such as the presence or absence of an interference wave and the frequency bandwidth of the interference wave from the reception device to the transmission device 1 is performed. In addition, the transmission device 1 informs the reception device of control information indicating null insertion positions, the control information being contained in transmission data. Alternatively, a null insertion rule may be determined in advance between the transmission device 1 and the reception device, so that the control information indicating null insertion positions can be reduced.

Figure 3:
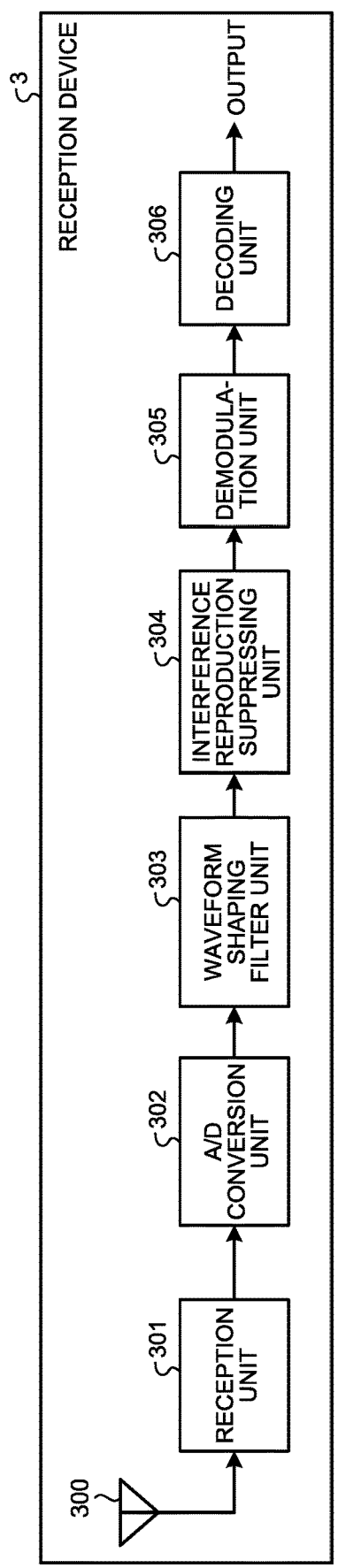
FIG. 3 is a diagram illustrating functional blocks of a reception device according to the first embodiment.

FIG. 3 is a diagram illustrating functional blocks of the reception device according to the first embodiment. A reception device 3 includes an antenna 300, a reception unit 301, an A/D conversion unit 302, a waveform shaping filter unit 303, an interference reproduction suppressing unit 304, a demodulation unit 305, and a decoding unit 306.

The antenna 300 receives radio-frequency signals. Radio-frequency signals received by the antenna 300 include a desired wave and an interference wave. The reception unit 301 converts the frequency of a received radio-frequency signal to an IF frequency or baseband signal that is an analog signal. The A/D conversion unit 302 converts the analog signal to a digital signal. The waveform shaping filter unit 303 performs band limitation of the digital signal for noise removal. The interference reproduction suppressing unit 304 reproduces interference components, removes the interference components from a baseband signal that is a digital signal, and outputs a data symbol in which the interference components have been removed. A baseband signal will be referred to as a received signal. Details of the operation of the interference reproduction suppressing unit 304 will be explained later. The demodulation unit 305 performs a demodulation process on the data symbol, and outputs a demodulation result that is a result of demapping used for error correction decoding. Upon receiving the demapping result, the decoding unit 306 performs error correction decoding, and outputs a decoding result. The processes performed by the antenna 300, the reception unit 301, the A/D conversion unit 302, the waveform shaping filter unit 303, the demodulation unit 305, and the decoding unit 306 are processes performed by a typical radio reception device, and are not particularly limited in respect of configuration. Note that, in the present embodiment, the reception device 3 acquires information on the positions in which null periods are provided, from the transmission device 1.

Figure 4:
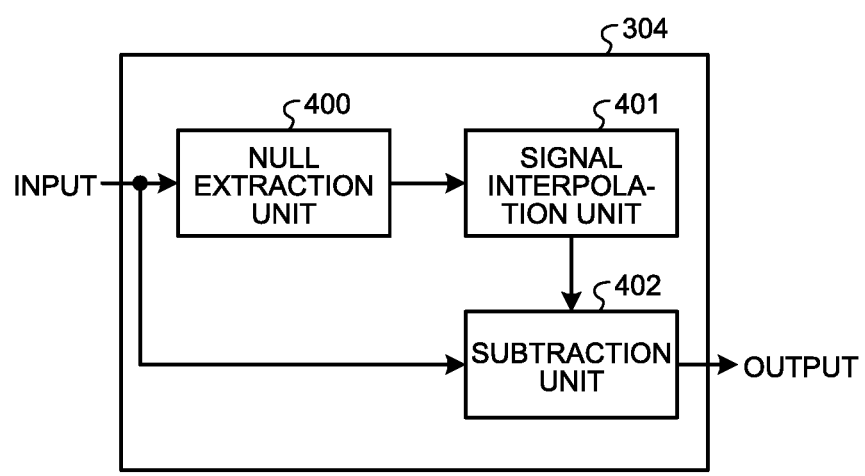
FIG. 4 is a diagram illustrating functional blocks of an interference reproduction suppressing unit according to the first embodiment.

FIG. 4 is a diagram illustrating functional blocks of the interference reproduction suppressing unit 304 according to the first embodiment. The interference reproduction suppressing unit 304 includes a null extraction unit 400, a signal interpolation unit 401, and a subtraction unit 402. The null extraction unit 400 extracts signals in null periods inserted by the time null insertion unit 102. The signal interpolation unit 401 interpolates the extracted signals in the null periods to reproduce the interference components in data symbol periods. The subtraction unit 402 subtracts the interference components in the data symbol periods, reproduced by the signal interpolation unit 401, from the received signal. The subtraction unit 402 will also be referred to as a first subtraction unit.

Details of the interference reproduction suppressing unit 304 according to the first embodiment will now be described. Although the number of oversamples of a received signal inputted to the interference reproduction suppressing unit 304 is not particularly limited, the number of oversamples is assumed to be one time a symbol rate and a signal with a symbol rate is assumed to be inputted thereto in the present embodiment for the sake of simplification of explanation.

Figure 5:
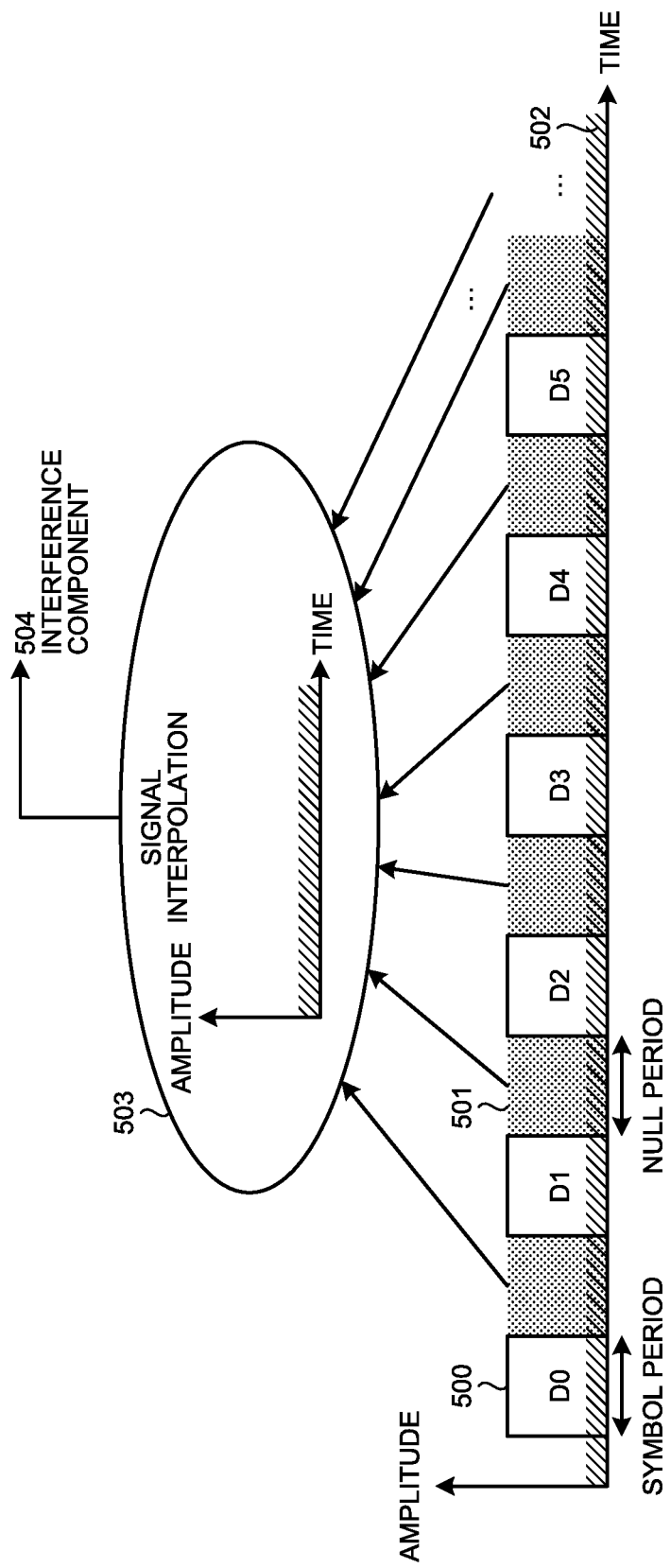
FIG. 5 is a diagram illustrating processing performed by the interference reproduction suppressing unit according to the first embodiment.

FIG. 5 is a diagram illustrating the process of signal interpolation according to the first embodiment. In FIG. 5, the horizontal axis represents time, and the vertical axis represents the amplitude of a signal. A data symbol 500 is a data symbol provided in a data symbol period. A null symbol 501 is a symbol in a null period provided between the data symbols. An interference wave 502 is a signal in which an interference wave and noise caused in the reception device are combined. Signal interpolation 503 is an interpolation process using the null symbols. An interference signal 504 is an interference component interpolated by signal interpolation 503. As illustrated in FIG. 5, a received symbol sequence can be divided into data symbols 500, which is a desired signal, and null symbols 501 inserted by the time null insertion unit 102. In addition, a received symbol sequence includes, in addition to a desired signal, the interference signal and an interference wave 502 generated in the reception device. A null symbol will also be referred to as a first symbol.

The null extraction unit 400 extracts only the null symbol 501 from the received symbol sequence and discards the data symbol 500. The signal interpolation unit 401 reproduces the interference component in data symbol period by interpolation using the null symbol extracted by the null extraction unit 400. Although the method for signal interpolation is not particularly limited, there is a method using a finite impulse response (FIR) filter, for example. Alternatively, there are methods for filtering in a frequency domain using discrete Fourier transform/fast Fourier transform (DFT/FFT) or inverse discrete Fourier transform/inverse fast Fourier transform (IDFT/IFFT), and the like. In any of the signal interpolation methods, the frequency pass band of an interpolation filter is set to a band including the interference, and thereby the influence of noise can be reduced and interference wave components can be effectively reproduced.

The subtraction unit 402 subtracts the interference components in the data symbol periods from the received signal, so as to suppress the interference components of the received signal. In this process, the interference components may be multiplied by a weighting factor that is set to a positive real number equal to or smaller than 1 before the subtraction. To reduce the influence of error included in the reproduced interference components, the said weighting factor is preferably adjusted depending on the proportion of interference included in the received signal. The subtraction unit 402 also outputs only the data symbols of the received signal with suppressed interference to the demodulation unit 305.

The encoding unit 100, the modulation unit 101, the time null insertion unit 102, the waveform shaping filter unit 103, the D/A conversion unit 104, the transmission unit 105, the reception unit 301, the A/D conversion unit 302, the waveform shaping filter unit 303, the interference reproduction suppressing unit 304, the demodulation unit 305, and the decoding unit 306 according to the first embodiment are implemented by a processing circuit that is an electronic circuit configured to perform their respective processes.

The processing circuit may be of dedicated hardware, or may be a control circuit including a memory and a central processing unit (CPU) that executes a program stored in the memory. Note that the memory is nonvolatile or volatile semiconductor memory such as a random access memory (RAM), a read only memory (ROM) or a flash memory, a magnetic disk, or an optical disk, for example. In a case where the processing circuit is a control circuit including a CPU, the control circuit is a control circuit 2200 having a configuration illustrated in FIG. 22, for example.

Figure 22:
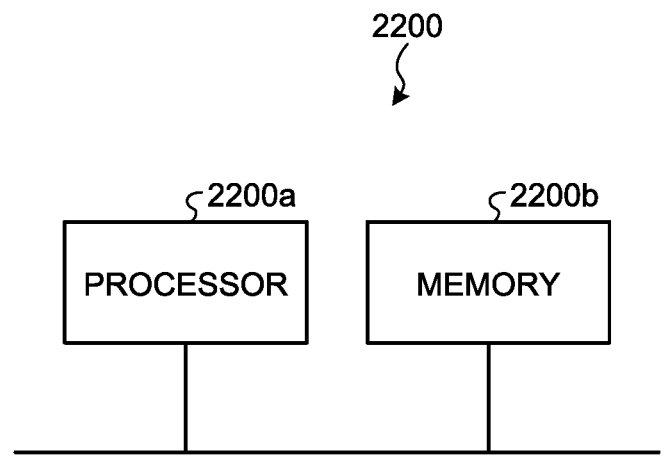
FIG. 22 is a diagram illustrating a control circuit.

As illustrated in FIG. 22, the control circuit 2200 includes a processor 2200a, which is a CPU, and a memory 2200b. In a case of the implementation being based on the control circuit 2200 illustrated in FIG. 22, the processor 2200a reads and executes programs, which correspond to the respective processes, stored in the memory 2200b. The memory 2200b is also used as a temporary memory in the processes performed by the processor 2200a.

As described above, the transmission device 1 inserts a null into a transmission symbol sequence. The reception device 3 reproduces interference components in data symbol periods by signal interpolation on the basis of the interference components appearing in the null symbol 501. The reception device 3 also suppresses the interference components included in the received signal on the basis of the reproduced interference components in the data symbol periods. The suppression of the interference components included in the received signal, performed by the reception device 3, can reduce deterioration of the reception quality (bit error rate) of the desired wave. Suppression of interference components included in the received signal improves interference immunity and enables stable radio communication to be achieved in radio wave propagation environment in which unknown interference is present. While a time domain null is explained as a signal whose amplitude is 0 in the present embodiment, the amplitude of a time domain null is not limited to 0, and a time domain null may be replaced with a signal with an electric power lower than the amplitude of a symbol sequence. The amplitude of a time domain null is an amplitude equal to or smaller than 1/R (R is 1 or larger) the amplitude of a symbol sequence, for example. A signal with amplitude of 0 or amplitude smaller than the amplitude of a symbol sequence is referred to as a first signal. In addition, a null period used for insertion of the time null insertion unit 102 may be a period in which the first signal is inserted instead of a null. While the transmission device 1 and the reception device 3 have their respective transmission function and reception function to perform communication in the present embodiment, a single communication device may have a function of the transmission device 1 and a function of the reception device 3 and the role of a function of the communication device may be changed depending on the direction of communication.

Second Embodiment

Figure 6:
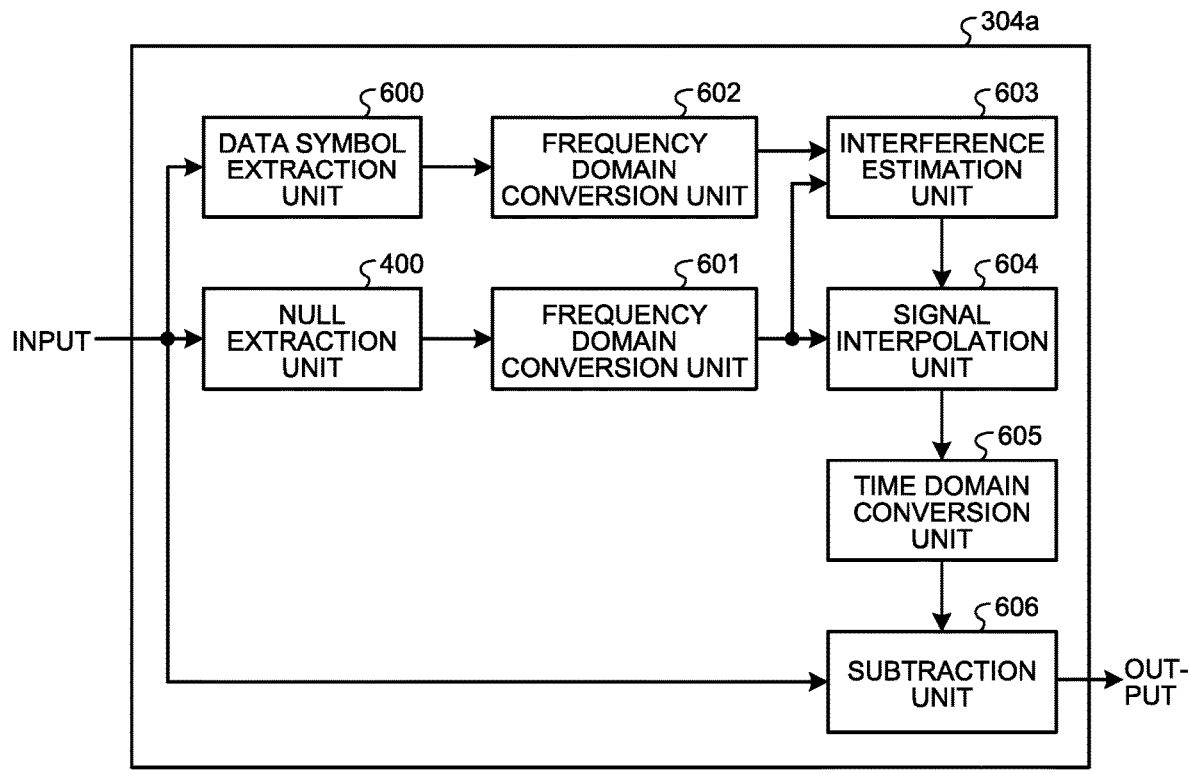
FIG. 6 is a diagram illustrating functional blocks of an interference reproduction suppressing unit in a reception device according to a second embodiment.

FIG. 6 is a diagram illustrating functional blocks of an interference reproduction suppressing unit in a reception device according to a second embodiment. Note that components that have the same functions as those in the first embodiment will be represented by the same reference signs as those in the first embodiment, and redundant description thereof will not be repeated. A reception device 3a includes an interference reproduction suppressing unit 304a instead of the interference reproduction suppressing unit 304. Note that the configuration of the reception device 3a is not illustrated. The interference reproduction suppressing unit 304a includes the null extraction unit 400, a data symbol extraction unit 600, a frequency domain conversion unit 601, a frequency domain conversion unit 602, an interference estimation unit 603, a signal interpolation unit 604, a time domain conversion unit 605, and a subtraction unit 606. The subtraction unit 606 will also be referred to as a first subtraction unit.

The data symbol extraction unit 600 extracts only a data symbol from a received symbol sequence, and discards a null symbol 501. The frequency domain conversion unit 601 converts a null symbol extracted by the null extraction unit 400 into a frequency domain signal by using DFT or FFT. The frequency domain conversion unit 602 converts a data symbol extracted by the data symbol extraction unit 600 into a frequency domain signal by using DFT or FFT and outputs the frequency domain signal. Note that, in the description of the second embodiment, the frequency domain conversion unit 601 and the frequency domain conversion unit 602 convert time domain signals by using FFT.

The interference estimation unit 603 calculates a power spectrum of a frequency component of each of the null symbol in frequency domain after the conversion and the data symbol in frequency domain after the conversion, detects interference on the basis of the shapes of the power spectrum, and estimates an interference frequency range. The interference frequency range is a range in frequency in which interference components are present. Detailed description of the interference estimation unit 603 will be presented later. The signal interpolation unit 604 reproduces interference components in the data symbol periods using null symbols and the interference frequency range. Detailed description of the signal interpolation unit 604 will be presented later. The time domain conversion unit 605 converts the reproduced interference components in frequency domain into a signal in time domain by IFFT, and outputs the interference components reproduced by the signal interpolation unit 604 as a time series signal. The subtraction unit 606 subtracts the interference components reproduced by the signal interpolation unit 604 and the time domain conversion unit 605 from the received signal to suppress the interference components of the received symbol sequence. The subtraction unit 606 also outputs only data symbols obtained by this suppression in interference.

Figure 7:
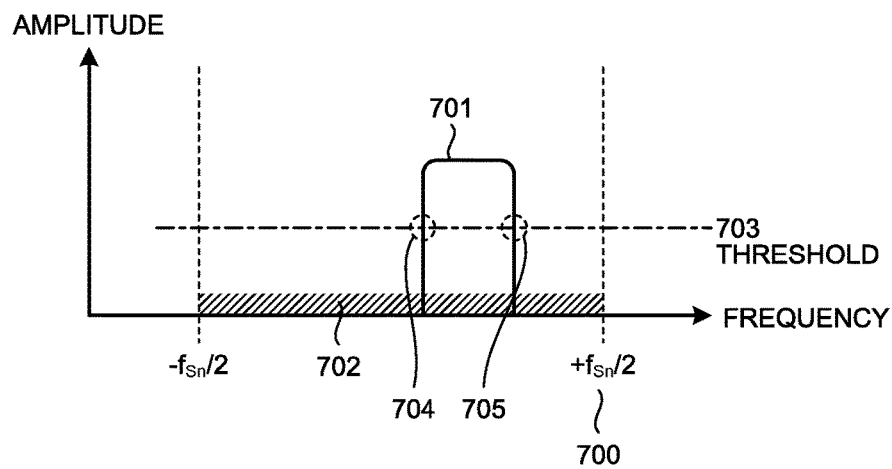
FIG. 7 is a graph illustrating an example of the power spectrum of an interference wave inputted to an interference estimation unit according to the second embodiment.

An operation of the interference estimation unit 603 will now be explained in detail. FIG. 7 is a graph illustrating an example of the power spectrum of an interference wave inputted to the interference estimation unit 603 according to the second embodiment. In FIG. 7, the horizontal axis represents frequency, and the vertical axis represents the amplitude of a signal. FIG. 7 illustrates a sampling frequency $f_{Sn}$ 700 of a null symbol, a power spectrum 701 of the interference wave, a power spectrum 702 of noise, a threshold 703 for determining the interference frequency range, a lowest frequency 704 in the interference frequency range, and a highest frequency 705 in the interference frequency range. When an interference wave component is included in a null symbol, a power spectrum with large amplitude appears at a frequency at which the interference wave is included in a frequency domain. In other words, the amplitude value of the power spectrum is larger as the power of the interference wave is higher. Based on this characteristic, the interference estimation unit 603 determines the range of interference frequency using the threshold 703. The interference frequency range estimated by the interference estimation unit 603 will also be referred to as a first interference frequency range. The interference estimation unit 603 will also be referred to as a first interference estimation unit.

Figure 8:
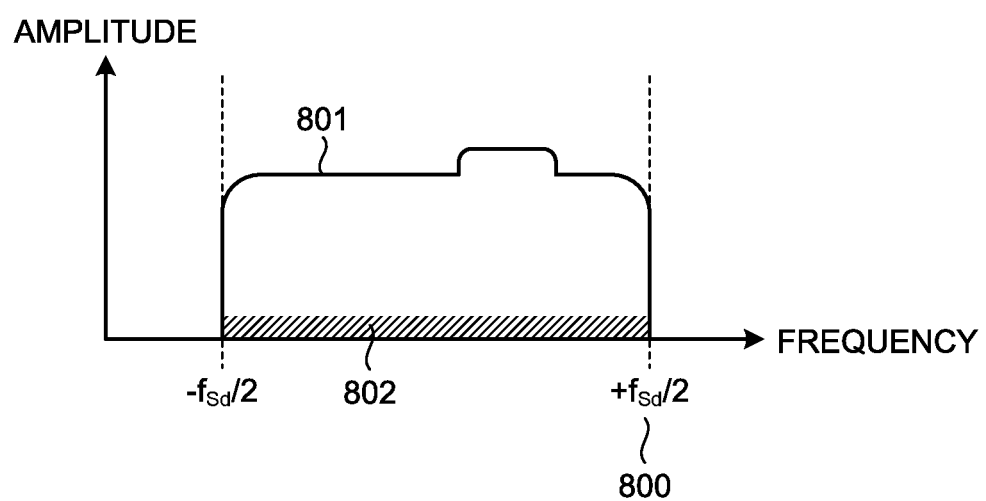
FIG. 8 is a graph illustrating the power spectrum of a data symbol inputted to the interference estimation unit according to the second embodiment.

FIG. 8 is a graph illustrating the power spectrum of a data symbol inputted to the interference estimation unit 603 according to the second embodiment. In FIG. 8, the horizontal axis represents frequency, and the vertical axis represents the amplitude of a signal. FIG. 8 illustrates a sampling frequency $f_{Sd}$ 800 of a data symbol, a power spectrum 801 of the data symbol, and a power spectrum 802 of noise. A threshold to be used to determine the range of interference frequency is generated with use of the power spectrum of the data symbol illustrated in FIG. 8. The power spectrum of the data symbol has a desired wave, an interference wave, and noise combined together therein. An average power $P_{fave}$ of the frequency components $P_i$ in this power spectrum is calculated according to an expression (1). In this expression, N represents the number of frequency points of FFT.

[Formula 1]

$$P_{fave} = \frac{1}{N} \sum_{i=1}^{N} P_i \quad (1)$$

The threshold $P_{TH}$ is determined according to an expression (2). In this expression, a represents a coefficient for adjusting the threshold. Adjustment of a depending on the magnitude of an interference power that is a target can improve the accuracy of detection of interference frequency.

[Formula 2]

$$P_{TH}=P_{fave}\cdot \alpha \qquad (2)$$

The interference frequency range can be estimated by comparison of the power spectra of the frequency components of the null symbol illustrated in FIG. 7 with the threshold $P_{TH}$. For example, the power spectra of the frequency components are sequentially compared with the threshold from the lowest frequency $-f_{Sn/2}$ toward the higher frequency $+f_{Sn/2}$ and the frequency component with which a power spectrum exceeding the threshold is first detected is determined to correspond to the lowest frequency 704 on the interference frequency. Subsequently, the power spectra of the frequency components are sequentially compared with the threshold from the highest frequency $+f_{Sn/2}$ toward the lower frequency $-f_{Sn/2}$, and the frequency component with which a power spectrum exceeding the threshold is first detected is determined to correspond to the highest frequency 705 on the interference frequency. In this manner, the range of the interference frequency can be estimated.

While an example of the determination method using a threshold is presented above, the interference frequency may also be estimated based on determination using a threshold with use of an average of two or more power spectrums obtained by FFT using data symbols at different times and null symbols, for example, thereby making it possible to improve the accuracy in estimation. When no frequency component with which the power spectrum exceeding the threshold is present as a result of comparison between the power spectrum of the null symbol and the threshold, it can be determined that no interference wave is included. In this case, the interference frequency range is outputted as 0 (zero) to the signal interpolation unit 604 so that the signal interpolation unit 604 is informed that no interference is present.

When interference is estimated to be included nearly over the entire interference frequency range between $-f_{Sn/2}$ and $+f_{Sn/2}$, the sampling frequency of the null symbols is insufficient, and the interference frequency range is thus used as an evaluation index for performing control to shorten the time domain null insertion interval in the transmission device 1. When the frequency range in which interference is estimated to be included is narrower than the interference frequency range between $-f_{Sn/2}$ and $+f_{Sn/2}$, the sampling frequency of the null symbols is excessive, and the interference frequency range is thus used as an evaluation index for performing control to enlarge the time domain null insertion interval in the transmission device 1. When it is determined that no interference is present, the interference frequency range is used as an evaluation index for control to interrupt insertion of a time domain null in the transmission device 1.

The interference frequency range estimated by the interference estimation unit 603 is inputted to the signal interpolation unit 604. The signal interpolation unit 604 determines a pass band in which a frequency component passes through the interpolation filter according to the estimated interference frequency range, performs filtering to remove frequency components outside of the pass band, and interpolates null symbols. The signal interpolation unit 604 also reproduces interference components in data symbol periods. While the interference estimation unit 603 has a configuration to perform filtering in a frequency domain in the second embodiment, much the same effect is produced even in the case of performing filtering in a time domain.

As described above, the interference estimation unit 603 estimates an interference frequency range from a received symbol sequence. Thus, even in a case where the positions of frequencies of interference components change with time, the interference frequency range is estimated, thereby leading to capability to appropriately select the pass band depending on the condition of interference in reproducing the interference. This improves the accuracy of reproduction of interference components. Accordingly, in contrast to the first embodiment, even in an environment in which the condition of interference changes with time, the influence of interference can be reduced, and the reception device 3a can reduce deterioration in reception quality (bit error rate) of desired waves. In addition, the null insertion rate and insertion interval in the transmission device 1 can be controlled depending on an interference condition with use of the presence or absence of interference and a result of estimation of an interference frequency range, so that the reception device 3a can improve the transmission efficiency (throughput) in an propagation environment in which interference is present.

Third Embodiment

Figure 9:
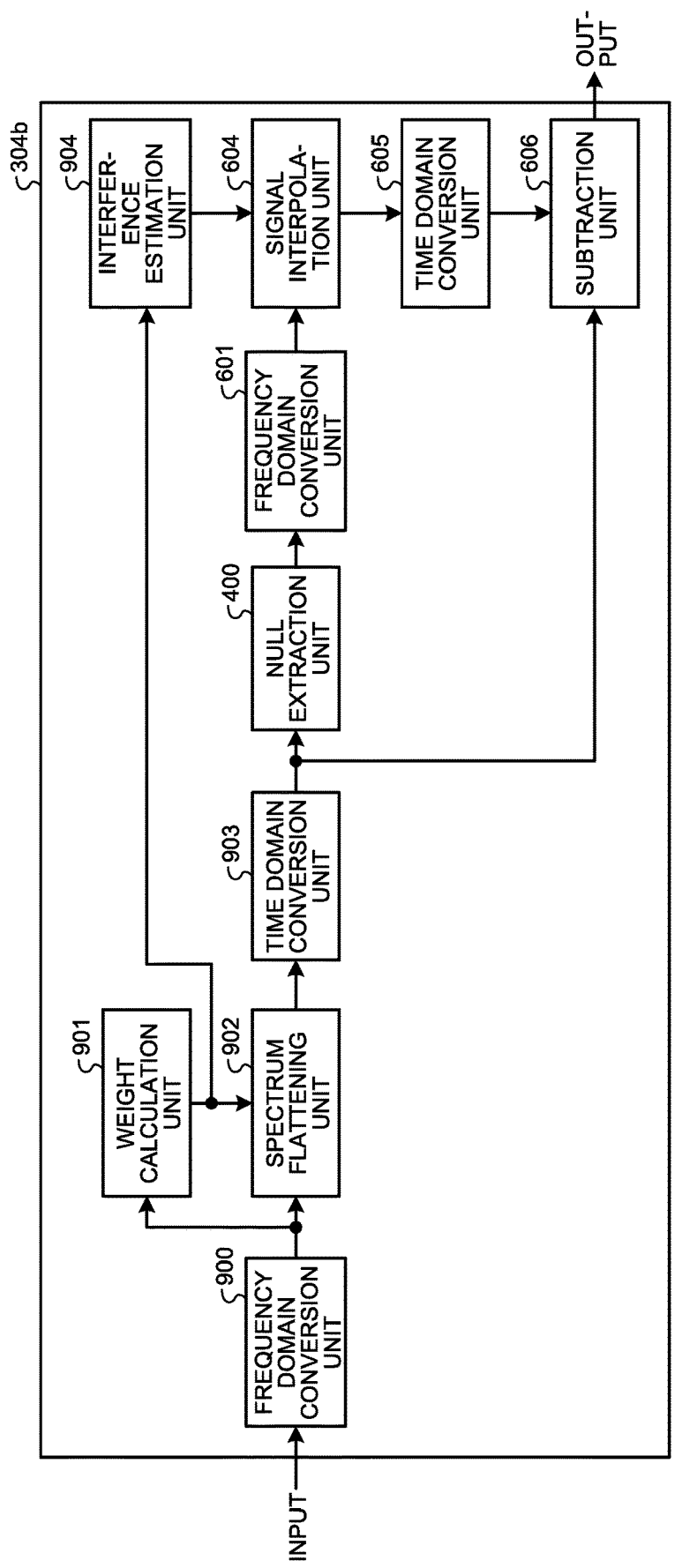
FIG. 9 is a diagram illustrating functional blocks of an interference reproduction suppressing unit according to a third embodiment.

FIG. 9 is a diagram illustrating functional blocks of an interference reproduction suppressing unit according to a third embodiment. Note that components that have the same functions as those in the second embodiment will be represented by the same reference signs as those in the second embodiment, and redundant description thereof will not be repeated. A reception device 3b includes an interference reproduction suppressing unit 304b instead of the interference reproduction suppressing unit 304a. Note that the configuration of the reception device 3b is not illustrated. The interference reproduction suppressing unit 304b includes a frequency domain conversion unit 900, an weight calculation unit 901, a spectrum flattening unit 902, a time domain conversion unit 903, an interference estimation unit 904, the null extraction unit 400, the frequency domain conversion unit 601, the signal interpolation unit 604, the time domain conversion unit 605, and the subtraction unit 606.

The frequency domain conversion unit 900 receives a received signal as an input, converts the received signal in time domain into a frequency domain signal by using DFT or FFT, and outputs the frequency domain signal. In the third embodiment, the frequency domain conversion unit 900 converts a time domain signal into a frequency domain signal by using FFT. The weight calculation unit 901 calculates a spectrum flattening weighting factor for flattening the shape of a power spectrum. The spectrum flattening unit 902 flattens the spectrum of the received signal according to the spectrum flattening weighting factor calculated by the weight calculation unit 901. Details of the weight calculation unit 901 and the spectrum flattening unit 902 will be described later. The time domain conversion unit 903 converts a frequency domain signal obtained by spectrum flattening into a time domain signal. The interference estimation unit 904 detects interference and estimates an interference frequency range using the spectrum flattening weighting factor. Details of the interference estimation unit 904 will be described later.

An operation of the weight calculation unit 901 and the spectrum flattening unit 902 will now be explained in detail. The weight calculation unit 901 calculates a power spectrum of a received signal converted into a frequency domain signal, and calculates weighting factors for suppressing frequency components whose power density rises owing to power of interference waves included in the received signal in the shape of the calculated power spectrum to flatten the shape of the power spectrum. A spectrum flattening weighting factor is calculated for each frequency component (each set of the number of FFT points). A weighting factor calculated by the weight calculation unit 901 will also be referred to as a first weighting factor.

A specific example of a method for calculating a spectrum flattening weighting factor will be explained. Ich and Qch for each FFT point of the received signal converted into a frequency domain are defined as fft_dati(k) and fft_datq(k), respectively. A power value of Ich and Qch is defined as fft_pow(k). An average power obtained by averaging in the time direction for each FFT point is defined as ave_fft_pow(k). An average power obtained by averaging in the frequency direction over all the FFT points is defined as cpow. The spectrum flattening weighting factor is defined as ifr_coef(k). Forgetting factors for infinite impulse response (IIR) averaging are defined as β and γ. Note that k represents an index number for an FFT point, which can have an integer value in a range of 0≤k<N (N is the number of FFT points). In addition, an initial value of ave_fft_pow(k) is 0, and an initial value of ifr_coef(k) is 1. In this case, a spectrum flattening weighting factor is obtained by calculations of expressions (3) to (6). In this example, there is shown a method of calculation performed at the time of updating a spectrum flattening weighting factor in one FFT period. While IIR averaging is used as an averaging method, any averaging method is not limited and any averaging method such as moving average can be applied in the present invention. The expression (3) is used to calculate a power value for each FFT point. The expression (4) is used to calculate an average power obtained by averaging in the time direction for each FFT point. The expression (5) calculates an average power obtained by averaging in the frequency direction over all the FFT points. The expression (6) is used to calculate a spectrum flattening weighting factor for each FFT point.

[Formula 3]

$$fft\_pow(k) = fft\_dati(k) \cdot fft\_dati(k) + fft\_datq(k) \cdot fft\_datq(k) \quad (3)$$

$$ave\_fft\_pow(k) = \beta \cdot fft\_pow(k) + (1 - \beta) \cdot ave\_fft\_pow(k) \quad (4)$$

$$cpow = \frac{1}{N}\left[\sum_{k=1}^{N}\{(ifr\_coef(k) \cdot ave\_fft\_pow(k))\}\right] \quad (5)$$

$$ifr\_coef(k) = \begin{cases} \gamma \cdot \left(\frac{cpow}{ave\_fft\_pow(k)}\right) + & \gamma \cdot \left(\frac{cpow}{ave\_fft\_pow(k)}\right) + \\ (1 - \gamma) \cdot ifr\_coef(k) & (1 - \gamma) \cdot ifr\_coef(k) < 1 \\ 1 & \text{otherwise} \end{cases} \quad (6)$$

In this manner, the spectrum flattening weighting factor is updated in every FFT calculation cycle. Note that overlap FFT can be applied such that FFT periods of a received signal overlap with each other, and in such application, a spectrum flattening weighting factor may be updated in every overlap FFT calculation cycle.

The spectrum flattening unit 902 multiplies each of Ich and Qch of the received signal converted into the frequency domain by the calculated spectrum flattening weighting factor (real number) to flatten the spectrum. A specific calculation method is shown in an expression (7). Note that output signals are defined as fil_dati(k) and fil_datq(k).

[Formula 4]

$$fil\_dati(k)=fft\_dati(k) \cdot \sqrt{ifr\_coef(k)}$$

$$fil\_datq(k)=fft\_datq(k) \cdot \sqrt{ifr\_coef(k)} \quad (7)$$

FIG. 10 illustrates a chart illustrating the operation of the weight calculation unit 901 and the spectrum flattening unit 902 according to the third embodiment. In FIG. 10, the horizontal axis represents frequency, and the vertical axis represents the amplitude of a signal. FIG. 10 illustrates a sampling frequency $f_S$ 1000 of the received signal, a power spectrum 1001 of the received signal, a power spectrum 1002 of noise, a flattening weighting factor 1003 for each frequency component, and the power spectrum of the received signal obtained by spectrum flattening. Because the time-averaged spectrum of the received signal converted into the frequency domain includes some interference wave, the amplitude significantly rises depending on the interference power as in a part (a) of FIG. 10. In contrast, when Ich and Qch of the received signal converted into the frequency domain are multiplied by the flattening weighting factor 1003 as in a part (b) of FIG. 10, the spectrum shape is flattened as in a part (c) of FIG. 10. The part (c) of FIG. 10 illustrates the power spectrum 1004 after the flattening. As described above, the spectrum flattening unit 902 can flatten a spectrum rising in the amplitude direction depending on the interference power by multiplying a received signal by a spectrum flattening weighting factor.

Figure 11:
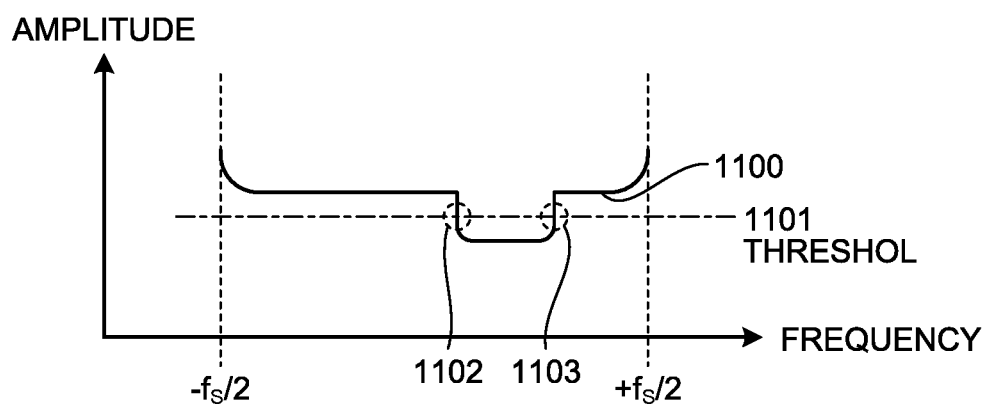
FIG. 11 is a graph illustrating an operation of an interference estimation unit according to the third embodiment.

FIG. 11 is a graph illustrating an operation of the interference estimation unit 904 according to the third embodiment. FIG. 11 illustrates an example of a spectrum flattening weighting factor for frequency components. In FIG. 11, the horizontal axis represents frequency, and the vertical axis represents the amplitude of a signal. FIG. 11 illustrates a flattening weighting factor 1100 for each frequency component, a threshold 1101 for determining an interference frequency range, a lowest frequency 1102 in the interference frequency range, and a highest frequency 1103 in the interference frequency range. The upper limit of the spectrum flattening weighting factor 1100 is 1, and the spectrum flattening weighting factor 1100 has a value smaller than 1 for the frequency at which an interference wave is included. The value of the factor is smaller as the interference power is higher. With exploiting this characteristic, the interference estimation unit 904 determines the range of interference frequency using the threshold 1101. The threshold is defined as a real number equal to or smaller than 1, and is adjusted depending on the magnitude of the interference power that is a target, thereby making it possible to improve the detection accuracy.

The interference frequency range can be estimated by comparison between the spectrum flattening weighting factor 1100 and the threshold 1101. For example, the spectrum flattening weighting factor for each frequency component is compared with the threshold from the lowest frequency $-f_{S/2}$ toward the higher frequency $+f_{S/2}$, and the frequency component with which a spectrum flattening weighting factor is first lower than the threshold is determined to correspond to the lowest frequency 1102 on the interference frequency. Subsequently, the spectrum flattening weighting factor for each frequency component is compared with the threshold from the highest frequency $+f_{S/2}$ toward the lower frequency $-f_{S/2}$, and the frequency component with which a spectrum flattening weighting factor is first lower than the threshold is determined to correspond to the highest frequency 1103 on the interference frequency. In this manner, the range of the interference frequency can be estimated. The estimated interference frequency range is outputted to the signal interpolation unit 604. When no frequency component with which the spectrum flattening weighting factor is lower than the threshold is present as a result of comparison between the spectrum flattening weighting factors and the threshold, it can be determined that no interference wave is included. In this case, the interference estimation unit 904 outputs 0 as the interference frequency range for notification of no interference.

The interference frequency range can be used as an evaluation index for control to shorten the null insertion interval in the transmission device 1 depending on the width of the estimated interference frequency range. Specifically, null symbols may be inserted at a sampling frequency that is twice or more than twice as high as the interference frequency range, and when information on the transmission device 1 is fed back from the reception device 3b, the null insertion rate and the null insertion interval depending on interference conditions that change with time can be efficiently determined. When it is determined that no interference is present, the interference frequency range can be used as an evaluation index for the transmission device 1 to control to interrupt insertion of a null.

As described above, in the third embodiment, when the interference power included in a received signal is significantly high, the weight calculation unit 901 calculates a spectrum flattening weighting factor such that the average amplitude of the spectrum of the received signal becomes constant. In addition, the spectrum flattening unit 902 flattens the spectrum using the spectrum flattening weighting factor. In addition, the interference estimation unit 904 estimates the interference using the spectrum flattening weighting factor. This enables the reception device 3b to preliminarily suppress high interference power before suppressing interference, and at the same time estimate the interference frequency range. For this reason, the reception device 3b can improve the accuracy of reproduction of interference components at the time of interference suppression. This enables reduction of the influence of interference even in an environment in which significantly high interference power is present, and it is possible to reduce deterioration of the reception quality (bit error rate) of desired waves.

Fourth Embodiment

Figure 12:
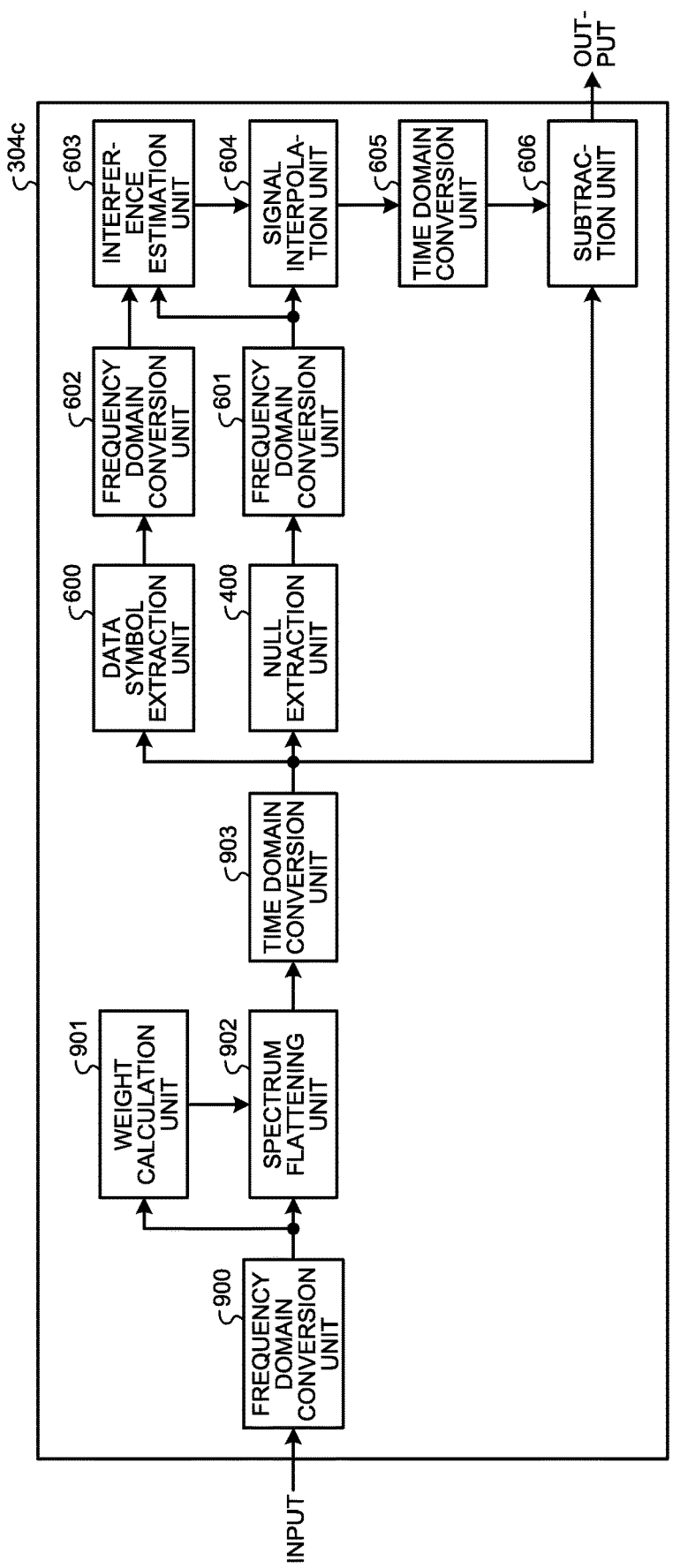
FIG. 12 is a diagram illustrating functional blocks of an interference reproduction suppressing unit according to a fourth embodiment.

FIG. 12 is a diagram illustrating functional blocks of an interference reproduction suppressing unit according to a fourth embodiment. Note that components that have the same functions as those in the second and third embodiments will be represented by the same reference signs as those in the second and third embodiments, and redundant description thereof will not be repeated. A reception device 3a includes an interference reproduction suppressing unit 304c instead of the interference reproduction suppressing unit 304a. Note that the configuration of the reception device 3c is not illustrated. The interference reproduction suppressing unit 304c includes the frequency domain conversion unit 900, the weight calculation unit 901, the spectrum flattening unit 902, the time domain conversion unit 903, the null extraction unit 400, the data symbol extraction unit 600, the frequency domain conversion unit 601, the frequency domain conversion unit 602, the interference estimation unit 603, the signal interpolation unit 604, the time domain conversion unit 605, and the subtraction unit 606.

By combining a spectrum flattening process similar to that in the third embodiment and the same interference estimation method as that in the second embodiment, it is possible to detect an interference wave with a lower interference power included in a received signal than in the third embodiment and estimate an interference frequency range of the interference wave. As a result of this, the reception device 3d can improve the effect of interference suppression in an propagation environment in which a smaller interference wave is included, and reduce deterioration of the reception quality (bit error rate) of desired waves.

Fifth Embodiment

Figure 13:
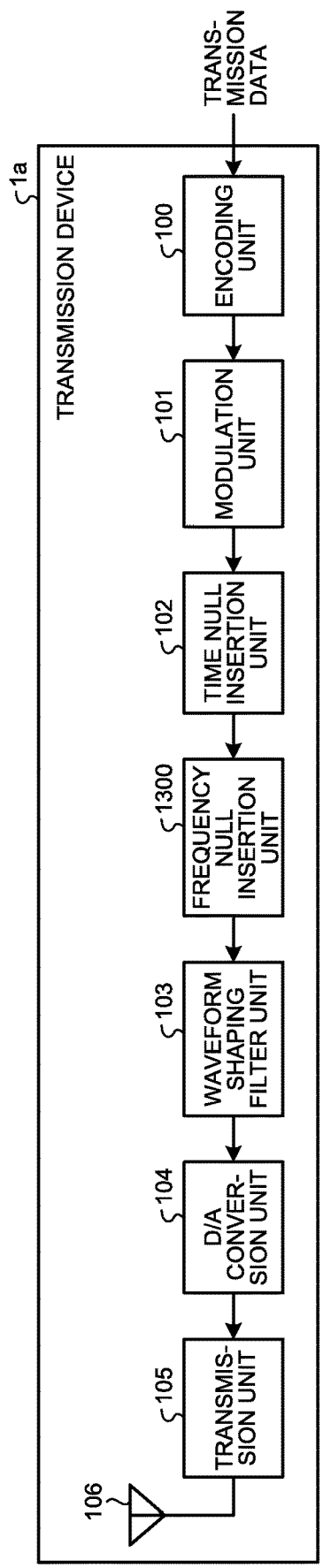
FIG. 13 is a diagram illustrating functional blocks of a transmission device according to a fifth embodiment.

FIG. 13 is a diagram illustrating functional blocks of a transmission device according to a fifth embodiment. Note that components that have the same functions as those in the first embodiment will be represented by the same reference signs as those in the first embodiment, and redundant description thereof will not be repeated. A transmission device 1a includes the encoding unit 100, the modulation unit 101, the time null insertion unit 102, a frequency null insertion unit 1300, the waveform shaping filter unit 103, the D/A conversion unit 104, and the transmission unit 105.

An operation of the frequency null insertion unit 1300 according to the fifth embodiment will now be explained in detail. The frequency null insertion unit 1300 inserts 0 or more frequency domain nulls (non-transmission signals on the frequency axis) into the spectrum of an output signal from the time null insertion unit 102 in the frequency direction. The frequency null insertion unit 1300 may be configured not to insert a frequency domain null. When the frequency null insertion unit 1300 inserts a frequency domain null, the frequency range of the spectrum of the signal becomes widened by the period in which one or more frequency nulls are inserted. In other words, the signal spectra are dispersedly located on the frequency axis over the frequency domain nulls. The frequency null insertion unit 1300 can also arbitrarily change the frequency positions, the bandwidth, the number, the interval and the like of the frequency domain nulls within the signal band at different times and transmit them. For example, the positions of the frequency domain nulls are circulated by being gradually shifted within the signal band in units of radio frames to transmit them, so that a frequency null is set at least once at every band within the signal band. The frequency null insertion unit 1300 will also be referred to as a second null insertion unit.

As described above, since the frequency null insertion unit 1300 inserts and transmits frequency domain nulls, the reception device can monitor the presence or absence of interference over the entire signal band. When the number of frequency domain nulls is small, the time taken to circulate the frequency domain nulls over the entire signal band increases, but the band that can be used for information transmission increases, so that the transmission efficiency is improved. Conversely, when the occupancy of frequency domain nulls within the signal band is increased, the time taken to circulate the frequency domain nulls decreases, but the transmission efficiency lowers. For this reason, it is desirable that the method of inserting frequency domain nulls be adjusted depending on an interference condition.

FIG. 14 illustrates a chart illustrating transmission spectra at the frequency null insertion unit 1300 according to the fifth embodiment. In FIG. 14, the horizontal axis represents frequency, and the vertical axis represents the amplitude of a signal. FIG. 14 illustrates a spectrum resulting from insertion of nulls (non-transmission periods) in frequency domain into a spectrum in which time domain nulls have been inserted. FIG. 14 illustrates a sampling frequency $f_S$ 1400 after insertion of the frequency domain nulls, a power spectrum 1401 of a transmission signal at time t, a frequency domain null 1402 at time t, a power spectrum 1403 of a transmission signal at time t+n, and a frequency domain null 1404 at time t+n. FIG. 14 illustrates transmission spectra at time t and time t+n in which a signal spectrum and a frequency domain null are inserted at a ratio of 1:1. The frequency domain nulls are arranged so that the frequency positions of the nulls at time t do not overlap with those at time t+n. The frequency null insertion unit 1300 is assumed to arrange a signal spectrum and a frequency domain null at a ratio of 1:1.

Figure 15:
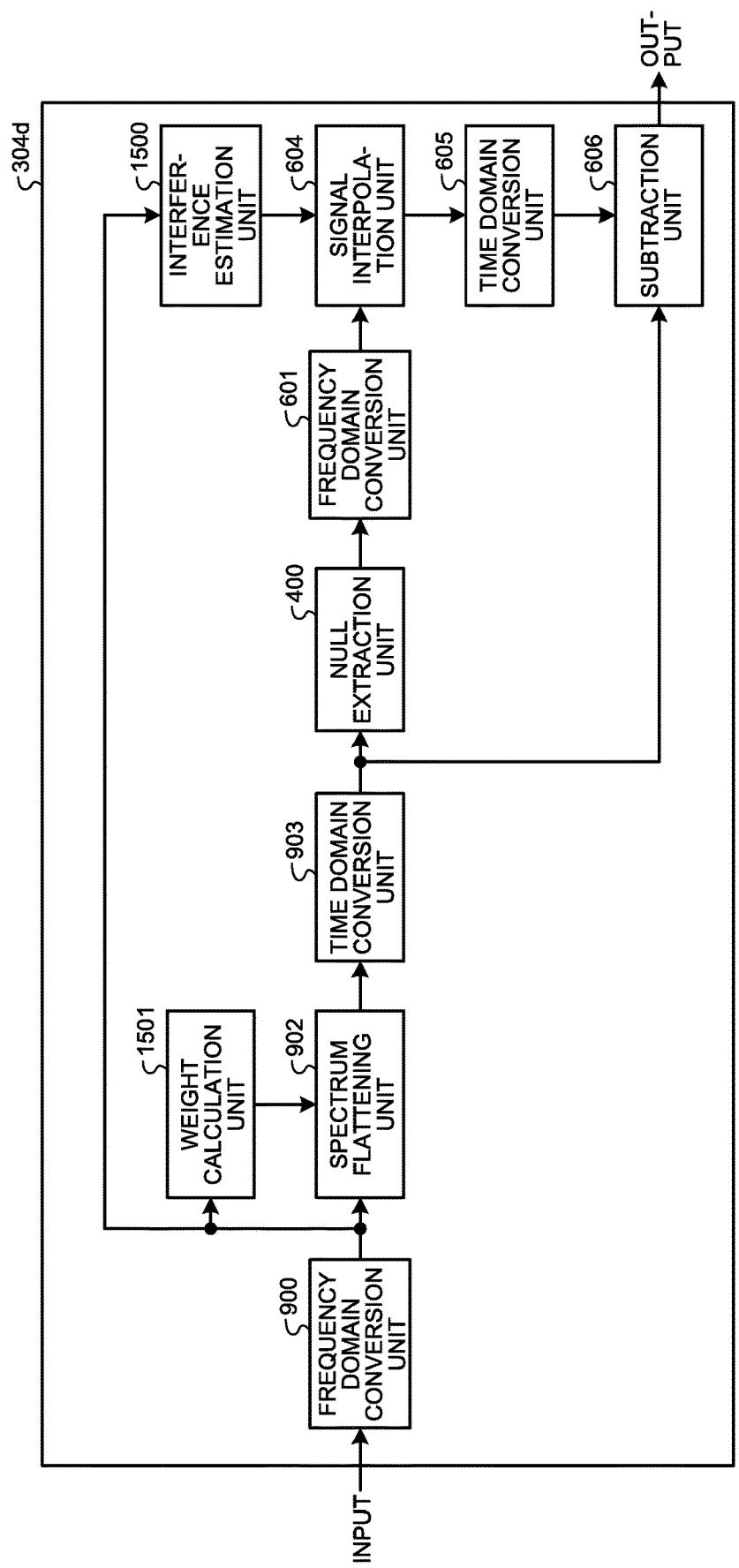
FIG. 15 is a diagram illustrating functional blocks of an interference reproduction suppressing unit according to the fifth embodiment.

A reception device 3d includes an interference reproduction suppressing unit 304d instead of the interference reproduction suppressing unit 304. Note that the configuration of the reception device 3d is not illustrated in a figure. FIG. 15 is a diagram illustrating functional blocks of an interference reproduction suppressing unit 304d according to the fifth embodiment. Note that components that have the same functions as those in the third embodiment will be represented by the same reference signs as those in the third embodiment, and redundant description thereof will not be repeated. The interference reproduction suppressing unit 304d includes the frequency domain conversion unit 900, an interference estimation unit 1500, a weight calculation unit 1501, the spectrum flattening unit 902, the time domain conversion unit 903, the null extraction unit 400, the frequency domain conversion unit 601, the signal interpolation unit 604, the time domain conversion unit 605, and the subtraction unit 606.

The interference estimation unit 1500 detects interference and estimates an interference frequency range using frequency domain nulls inserted by the frequency null insertion unit 1300 of the transmission device 1a. The weight calculation unit 1501 calculates a power spectrum of a received signal converted into a frequency domain signal, and calculates weighting factors for suppressing frequency components by which the power density rises owing to power of interference waves included in the received signal in the shape of the calculated power spectrum to flatten the shape of the power spectrum.

FIG. 16 is a chart illustrating an operation of the interference estimation unit 1500 according to the fifth embodiment. FIG. 16 illustrates examples of power spectra of received signals at time t and time t+n, respectively. In FIG. 16, the horizontal axis represents frequency, and the vertical axis represents amplitude. FIG. 16 illustrates a sampling frequency $f_S$ 1600 of a received signal, a power spectrum 1601 of the received signal at time t, a frequency domain null period 1602 at time t, a power spectrum 1603 of the received signal at time t+n, a frequency domain null period 1604 at time t+n, a power spectrum 1605 of noise, a power spectrum 1606 of an interference wave, and a threshold 1607 for detecting interference and determining an interference frequency range.

An operation of the interference estimation unit 1500 will now be described in detail. The interference estimation unit 1500 detects interference and estimates an interference frequency range in the power spectrum of a received signal at time t. The interference detection and the interference frequency range are estimated by determination using the threshold 1607 on signal components appearing in the frequency domain nulls. The threshold 1607 is calculated by normalization with an average power of the received signal components. An average power $P_{fnave}$ of the frequency components $P_i$ of the received signal is calculated according to an expression (8). In this expression, M represents the number of frequency points of the received signal.

[Formula 5]

$$P_{fnave} = \frac{1}{M}\sum_{i=1}^{M} P_i \qquad (8)$$

A threshold $P_{NTH}$ is calculated according to an expression formula (9). In this expression, δ represents a coefficient for adjusting the threshold. Adjustment of δ depending on the magnitude of an interference power that is a target can improve the detection accuracy.

[Formula 6]

$$P_{NTH} = P_{fnave} \cdot \delta \qquad (9)$$

The interference frequency range can be estimated by comparison between the frequency domain null period 1602 at time t and the threshold 1607 illustrated in FIG. 16. For example, the frequency components of the frequency domain nulls are sequentially compared with the threshold from the lowest frequency $-f_{S/2}$ toward the higher frequency $+f_{S/2}$, and the frequency component that has first exceeded the threshold is determined to correspond to the lowest frequency on the interference frequency at time t. Subsequently, the frequency components of the frequency domain nulls are sequentially compared with the threshold from the highest frequency $+f_{S/2}$ toward the lower frequency $-f_{S/2}$, and the frequency component that has first exceeded the threshold is determined to correspond to the highest frequency on the interference frequency at time t. In this manner, the range of the interference frequency at time t can be estimated. In a similar manner, the lowest frequency and the highest frequency on the interference frequency at time t+n can also be estimated from the power spectrum of a received signal at time t+n. The estimated lowest frequencies at time t and time t+n are compared with each other, and the lower thereof is determined to be the lowest frequency at last. In a similar manner, the estimated highest frequencies at time t and time t+n are compared with each other, and the higher thereof is determined to be the highest frequency at last. The range between the lowest frequency and the highest frequency corresponds to the interference frequency range. Information on the estimated interference frequency range is outputted to the signal interpolation unit 604.

When no frequency component exceeding the threshold is present as a result of comparison between the signal components of the frequency domain nulls and the threshold, it can be determined that no interference wave is included. In this case, the interference estimation unit 1500 outputs 0 as the interference frequency range to inform the signal interpolation unit 604 that no interference is present. In addition, the interference frequency range can be used as an evaluation index for control to shorten an insertion interval of the time domain null in the transmission device 1a depending on the width of the estimated interference frequency range. Specifically, null symbols may be inserted at a sampling frequency that is twice or more than twice as high as the interference frequency range, and when information on the transmission device 1a is fed back from the reception device, the null insertion rate and an insertion interval depending on interference conditions that change with time can be efficiently determined. In a similar manner, control to shorten the insertion interval of the frequency domain nulls depending on the interference frequency range is performed, thereby making it possible to improve the transmission efficiency. When it is determined that no interference is present, the interference frequency range can be used as an evaluation index for control to interrupt insertion of a time domain null and a frequency domain null in the transmission device 1a.

The weight calculation unit 1501 calculates the power spectrum of a received signal converted into a frequency domain signal, and calculates weighting factors for suppressing frequency components by which the power density rises owing to power of interference waves included in the received signal in the shape of the calculated power spectrum to flatten the shape of the power spectrum. A weighting factor is calculated for each FFT point of the frequency components of a signal spectrum excluding the frequency components of the frequency domain nulls.

A specific example of a method for calculating a spectrum flattening weighting factor will be explained. Ich and Qch for each FFT point corresponding to the signal spectrum of a received signal converted into a frequency domain signal are defined as fft_dati(k') and fft_datq(k'), respectively. A power value of Ich and Qch is defined as fft_pow(k'). An average power obtained by averaging in the time direction for each FFT point corresponding to the signal spectrum is defined as ave_fft_pow(k'). An average power obtained by averaging in the frequency direction over all the FFT points corresponding to the signal spectrum is defined as cpow. The spectrum flattening weighting factor is defined as ifr_coef(k). Forgetting factors for IIR averaging are defined as β, and γ. Note that k represents an index number of an FFT point, which is an integer value in a range of 0≤k<N (N is the number of FFT points), and k' represents an index number of an FFT point corresponding to the signal spectrum excluding the frequency nulls, which has an integer value in a range of 0≤k'<N (N is the number of FFT points, where the number values of k' is M (M≤N)). In addition, an initial value of ave_fft_pow(k') is 0. An initial value of ifr_coef(k) is 1. In this case, the weight calculation unit 1501 can calculate a spectrum flattening weighting factor by calculation of expressions (10) to (13). In this example, there is presented a method of calculation performed for updating a spectrum flattening weighting factor in one FFT period. While IIR averaging is used as an averaging method, the averaging method is not limited and any averaging method such as moving average can be applied in the present invention. The expression (10) calculates a power value for each FFT point corresponding to the signal spectrum. The expression (11) calculates an average power obtained by averaging in the time direction for each FFT point corresponding to the signal spectrum. The expression (12) calculates an average power obtained by averaging in the frequency direction over all the FFT points corresponding to the signal spectrum. The expression (13) calculates a spectrum flattening weighting factor for each FFT point.

[Formula 7]

$$\text{fft\_pow}(k') = \text{fft\_dati}(k') \cdot \text{fft\_dati}(k') + \text{fft\_datq}(k') \cdot \text{fft\_datq}(k') \quad (10)$$

$$\text{ave\_fft\_pow}(k') = \beta \cdot \text{fft\_pow}(k') + (1 - \beta) \cdot \text{ave\_fft\_pow}(k') \quad (11)$$

$$cpow = \frac{1}{M}\left[\sum_{k=1}^{N}\{\text{ifr\_coef}(k') \cdot \text{ave\_fft\_pow}(k'))\}\right] \quad (12)$$

$$\text{ifr\_coef}(k) = \begin{cases} \gamma \cdot \left(\frac{cpow}{\text{ave\_fft\_pow}(k')}\right) + \ldots \gamma \cdot \left(\frac{cpow}{\text{ave\_fft\_pow}(k')}\right) + \\ (1-\gamma) \cdot \text{ifr\_coef}(k) \quad (1-\gamma) \cdot \text{ifr\_coef}(k) < 1 \\ 1 \quad \ldots \quad \text{otherwise} \end{cases} \quad (13)$$

In this manner, the spectrum flattening weighting factor is updated in every FFT calculation cycle. In FFT calculation with different arrangements of frequency domain nulls, however, a spectrum flattening weighting factor needs to be calculated and updated individually for each arrangement. For example, this is a case where the arrangement of the frequency domain nulls at time k is different from the arrangement of the frequency domain nulls at time k+n are different from each other, wherein a spectrum flattening weighting factor is calculated and updated individually for each of the arrangements.

FIG. 17 illustrates a chart illustrating operation of spectrum flattening according to the fifth embodiment. In FIG. 17, the horizontal axis represents frequency, and the vertical axis represents the amplitude of a signal. FIG. 17 illustrates a sampling frequency $f_S$ 1700 of the received signal, a power spectrum 1701 of the received signal, a power spectrum 1702 of noise, a power spectrum 1703 of an interference wave, a flattening weighting factor 1704 for each frequency component, and a flattened power spectrum 1705 obtained by spectrum flattening based on the flattening weighting factor. Because the averaged spectrum of the received signal converted into the frequency domain includes the power spectrum 1703 of the interference wave, the amplitude significantly rises depending on the interference power. In contrast, the spectrum shape obtained by multiplying Ich and Qch of the received signal converted into the frequency domain by the flattening weighting factor 1704 becomes the flattened power spectrum 1705. As described above, multiplication by the spectrum flattening weighting factor can flatten a spectrum rising in the amplitude direction depending on the interference power. Thus, when a frequency domain null is inserted, spectrum flattening is applied only to the frequency components of a signal spectrum, and the spectrum flattening weighting factor for the frequency components of the frequency domain null is set to 1 and no control is performed thereon.

As described above, the transmission device 1a inserts nulls in the frequency direction to transmit a transmission signal including no-signal periods in the power spectrum. The reception device 3d receives the signal in which nulls in the frequency direction are inserted, so that detection of weak and wideband interference waves included in a received signal band and estimation of an interference frequency range thereof can be realized, thereby making it possible to reduce deterioration of the reception quality (bit error rate) of desired waves. While a frequency domain null is explained as a signal whose power value is 0 in the fifth embodiment, the power value of a frequency domain null is not limited to 0, and a frequency domain null may be replaced with a signal with a power lower than a power of a symbol sequence. The power of a frequency domain null is a power equal to or lower than 1/R (R is 1 or larger) of the power of a symbol sequence, for example. A signal with a power of 0 or with a power lower than a power of a symbol sequence will be referred to as a second signal.

Sixth Embodiment

Figure 18:
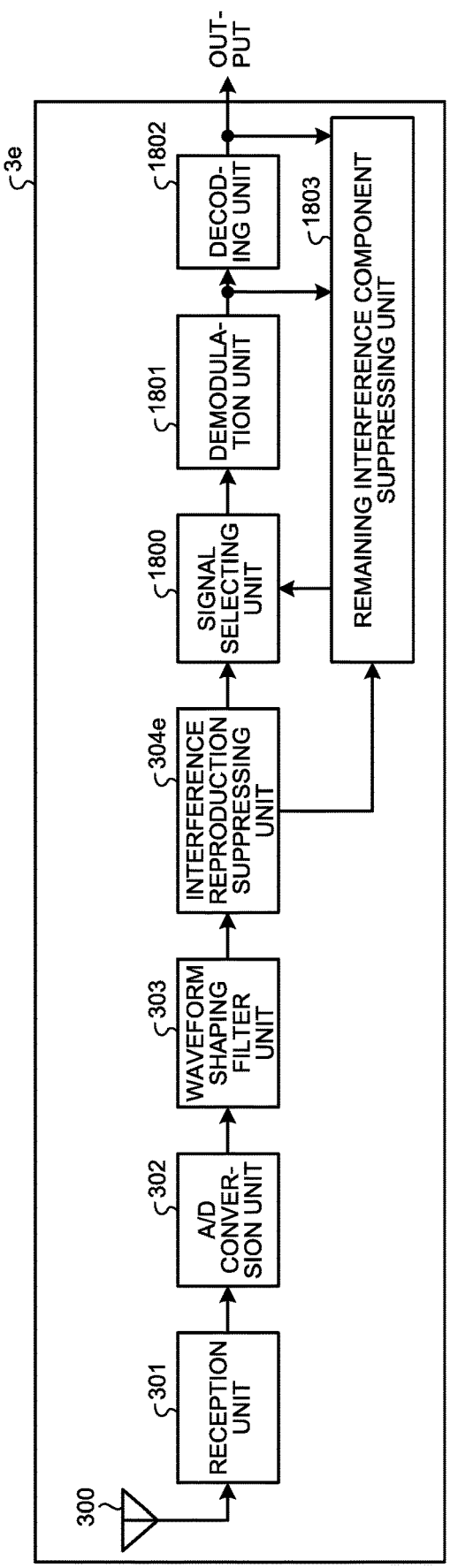
FIG. 18 is a diagram illustrating functional blocks of a reception device according to a sixth embodiment.

FIG. 18 is a diagram illustrating functional blocks of a reception device according to a sixth embodiment. Note that components that have the same functions as those in the first embodiment will be represented by the same reference signs as those in the first embodiment, and redundant description thereof will not be repeated. A reception device 3e includes the antenna 300, the reception unit 301, the A/D conversion unit 302, the waveform shaping filter unit 303, an interference reproduction suppressing unit 304e, a signal selecting unit 1800, a demodulation unit 1801, a decoding unit 1802, and a remaining interference component suppressing unit 1803.

The interference reproduction suppressing unit 304e is supplemented with a function of transmitting an interference frequency range to the remaining interference component suppressing unit 1803 as compared with the interference reproduction suppressing units 304a to 304d. The signal selecting unit 1800 performs selection of signals outputted from the interference reproduction suppressing unit 304e and the remaining interference component suppressing unit 1803, respectively. Details of the signal selecting unit 1800 will be described later. The demodulation unit 1801 is supplemented with a function of transmitting a demodulation result to the remaining interference component suppressing unit 1803 as compared with the demodulation unit 305. The decoding unit 1802 is supplemented with a function of transmitting a decoding result to the remaining interference component suppressing unit 1803 as compared with the decoding unit 306. The remaining interference component suppressing unit 1803 suppresses a remaining interference component included in the demodulation result. Details of the remaining interference component suppressing unit 1803 will be described later.

Next, an operation of the reception device 3e will be explained. When a first demodulation process and a first decoding process are performed, the signal selecting unit 1800 outputs data symbols that are obtained by removal of interference components and outputted from the interference reproduction suppressing unit 304e to the demodulation unit 1801. When second or subsequent demodulation process and decoding process are performed, the signal selecting unit 1800 selects a signal outputted from the remaining interference component suppressing unit 1803 and outputs the selected signal to the demodulation unit 1801. The methods of the demodulation process and the decoding process of the demodulation unit 1801 and the decoding unit 1802 are not particularly limited.

Figure 19:
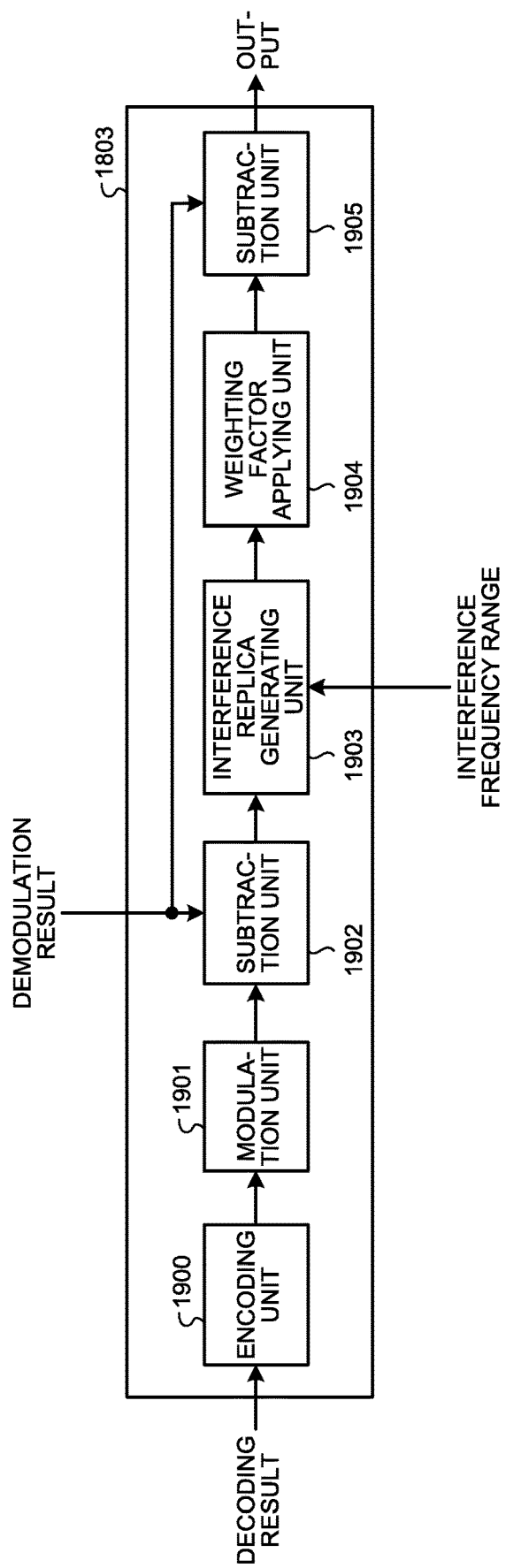
FIG. 19 is a diagram illustrating functional blocks of a remaining interference component suppressing unit according to the sixth embodiment.

FIG. 19 is a diagram illustrating functional blocks of the remaining interference component suppressing unit 1803 in the reception device according to the sixth embodiment. The remaining interference component suppressing unit 1803 includes an encoding unit 1900, a modulation unit 1901, a subtraction unit 1902, an interference replica generating unit 1903, a weighting factor applying unit 1904, and a subtraction unit 1905.

Details of an operation of the remaining interference component suppressing unit 1803 according to the sixth embodiment will now be explained. The encoding unit 1900 performs error correction coding again using the decoding result obtained by the error correction decoding from the decoding unit 1802, and outputs the encoded data to the modulation unit 1901. Note that the encoding performed by the encoding unit 1900 is the same as the encoding process performed by the encoding unit 100 in the transmission device 1. The modulation unit 1901 performs a modulation process on the encoded data, and outputs the modulated output data to the subtraction unit 1902. Note that the modulation process performed by the modulation unit 1901 is the same as the modulation process performed by the modulation unit 101 in the transmission device 1. The subtraction unit 1902 subtracts the modulated output data from demodulated output data outputted by the demodulation unit 1801, and outputs a demodulated signal. The interference replica generating unit 1903 generates an interference replica using the demodulated signal outputted by the subtraction unit 1902 and the interference frequency range estimated by the interference reproduction suppressing unit 304e. Specifically, band-limiting filtering is performed according to the inputted interference frequency range with using the range as a pass band. Note that the method for implementation of the band-limiting filter is not particularly limited, and examples thereof include a method using an FIR filter and a method of filtering in the frequency domain using DFT/FFT or IDFT/IFFT. With any of the methods, the frequency pass band of a band-limiting filter is set to a band in which interference is included, thereby making it possible to reduce the influence of noise, effectively extract an interference wave component, and generate an interference replica.

The weighting factor applying unit 1904 multiplies the interference replica generated by the interference replica generating unit 1903 by a weighting factor to reduce the influence of noise included in the interference frequency range. The weighting factor has a variable value depending on the remaining interference power at each repetition of processing to make interference suppression more efficient, thereby making it possible to reduce the number of repetitions of processing. The weighting factor used for the multiplication performed by the weighting factor applying unit 1904 will also be referred to as a second weighting factor. The subtraction unit 1905 subtracts an interference replica component multiplied by the weighting factor from the demodulation result outputted by the demodulation unit 1801 to thereby obtain a demodulation result with suppressed remaining interference components. The subtraction unit 1905 outputs the demodulation result to the signal selecting unit 1800. The subtraction unit 1905 will also be referred to as a second subtraction unit.

The reception device 3e repeats the demodulation process and the decoding process using the demodulation result in which remaining interference components outputted to the signal selecting unit 1800 have been suppressed. The remaining interference component suppressing unit 1803 generates a demodulation result subjected to interference suppression again using a demodulation result and a decoding result obtained in a similar manner. Repetition of these processes can improve the effect of suppressing remaining interference components. The number of repetitions may be a predetermined fixed number, or the repetition of processing may be completed when it is determined that no error is present after error detection determination is performed in advance in such a manner as cyclic redundancy check (CRC) or a similar method for the transmission data.

As described above, in the sixth embodiment, a demodulation result outputted by the demodulation unit 1801, decoded data outputted by the decoding unit 1802, and an interference frequency range are used to generate a replica, and the replica is used to extract and suppress the remaining interference components, thereby making it possible to reduce the influence of the interference components remaining in the received signal. The reception device 3e thus improves the interference suppressing effect, and can reduce deterioration of the reception quality (bit error rate) of a desired wave.

Seventh Embodiment

Figure 20:
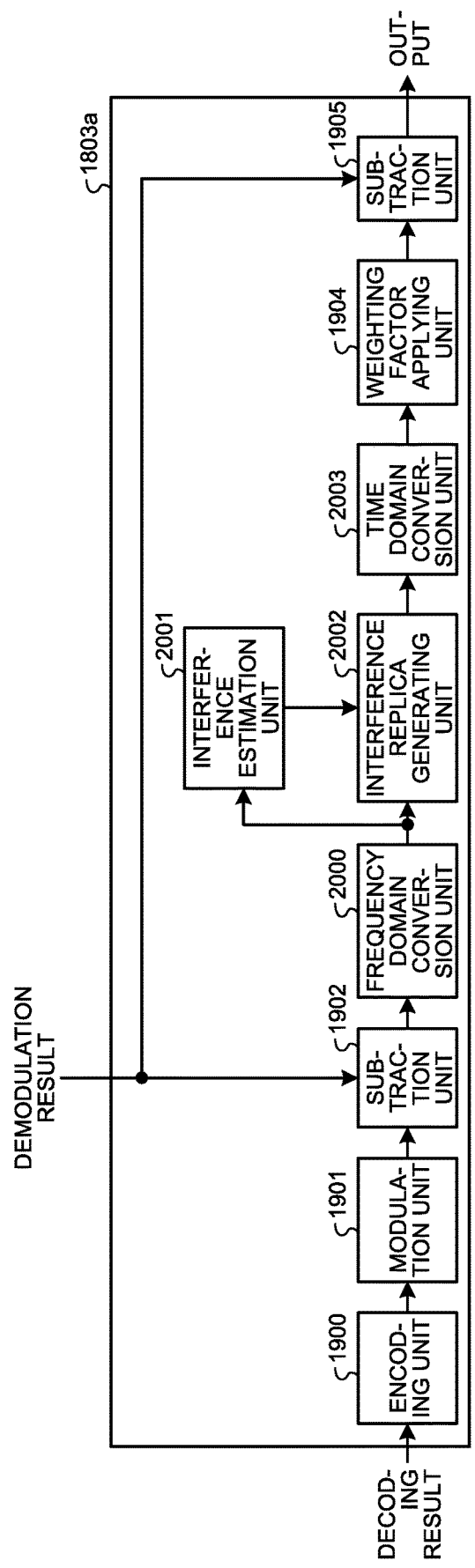
FIG. 20 is a diagram illustrating functional blocks of a remaining interference component suppressing unit according to a seventh embodiment.

FIG. 20 is a diagram illustrating functional blocks of a remaining interference component suppressing unit according to a seventh embodiment. Note that components that have the same functions as those in the sixth embodiment will be represented by the same reference signs as those in the sixth embodiment, and redundant description thereof will not be repeated. A remaining interference component suppressing unit 1803*a* includes the encoding unit 1900, the modulation unit 1901, the subtraction unit 1902, a frequency domain conversion unit 2000, an interference estimation unit 2001, an interference replica generating unit 2002, a time domain conversion unit 2003, the weighting factor applying unit 1904, and the subtraction unit 1905.

The frequency domain conversion unit 2000 converts a time domain signal into a frequency domain signal. The interference estimation unit 2001 detects interference from the extracted remaining interference components included in the received signal, and estimates an interference frequency range. The interference estimation unit 2001 will also be referred to as a second interference estimation unit. The interference frequency range estimated by the interference estimation unit 2001 will also be referred to as a second interference frequency range. The interference replica generating unit 2002 generates an interference replica using information on the interference frequency range estimated by the interference estimation unit 2001. The time domain conversion unit 2003 converts a frequency domain signal into a time domain signal.

Figure 21:
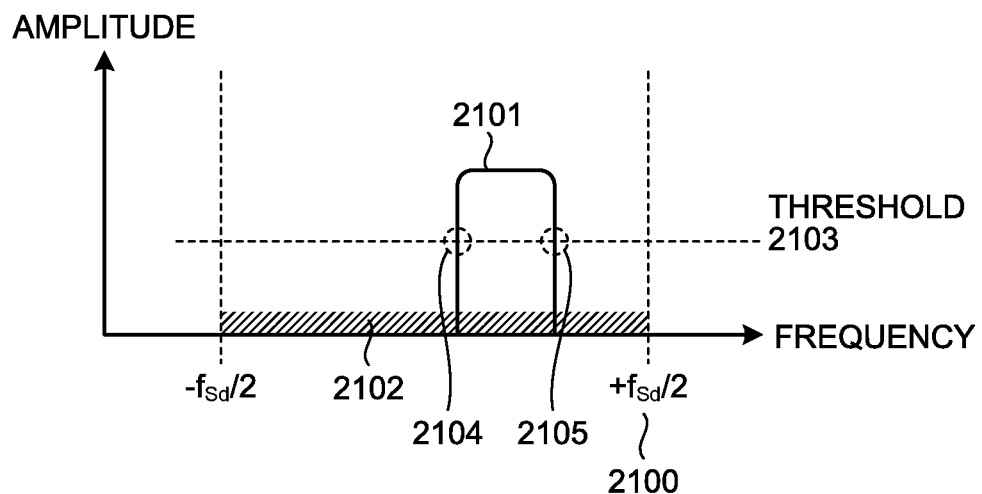
FIG. 21 is a graph illustrating an example of a power spectrum of an interference wave according to the seventh embodiment.

FIG. 21 is a graph illustrating an example of a power spectrum of an interference wave according to the seventh embodiment. In FIG. 21, the horizontal axis represents frequency, and the vertical axis represents the amplitude of a signal. FIG. 21 illustrates the sampling frequency $f_{Sd}$ 2100 of a data symbol, the power spectrum 2101 of an interference wave, the power spectrum 2102 of noise, a threshold 2103 for determining an interference frequency range, the lowest frequency 2104 in the interference frequency range, and the highest frequency 2105 in the interference frequency range. The interference estimation unit 2001 calculates power spectra of frequency components of a remaining interference signal included in a received signal converted into a frequency domain by using FFT or the like by the frequency domain conversion unit 2000, detects interference and estimates an interference frequency range from the shapes of the power spectra.

When an interference wave component remains, a power spectrum with an amplitude at a frequency at which the interference wave is included appears in the frequency domain. As the interference power is higher, the amplitude value of the power spectrum is larger. On the basis of this characteristic, the interference estimation unit 2001 determines the range of interference frequency using the threshold 2103. What is used as the threshold is a value obtained by normalization with an average value of all frequency components of the power spectra. An average power $P_{fiave}$ of the frequency components $P_i$ of the power spectra is calculated according to an expression (14). In this expression, N represents the number of frequency points of FFT.

[Formula 8]

$$P_{fiave} = \frac{1}{N}\sum_{i=1}^{N} P_i \qquad (14)$$

The threshold $P_{ITH}$ is determined according to an expression (15). In this expression, represents a coefficient for adjusting the threshold. Adjustment of depending on the magnitude of an interference power that is a target can improve the detection accuracy.

[Formula 9]

$$P_{ITH} = P_{fiave} \cdot \varepsilon \qquad (15)$$

The interference frequency range can be estimated by comparison of the power spectra of the frequency components illustrated in FIG. 21 with the threshold $P_{ITH}$. For example, the power spectra of the frequency components are sequentially compared with the threshold from the lowest frequency $-f_{Sd/2}$ toward the higher frequency $+f_{Sd/2}$, and the frequency component with which a power spectrum exceeding the threshold is first detected is determined to correspond to the lowest frequency 2104 on the interference frequency. Subsequently, the power spectra of the frequency components are sequentially compared with the threshold from the highest frequency $+f_{Sd/2}$ toward the lower frequency $-f_{Sd/2}$, and the frequency component with which a power spectrum exceeding the threshold is first detected is determined to correspond to the highest frequency 2105 of the interference frequency. In this manner, the range of the interference frequency can be estimated. While an example of the determination method using a threshold is presented above, the interference frequency can also be estimated by determination using a threshold with use of an average of two or more power spectra obtained by FFT using received signals at different times, for example, so as to improve the accuracy of estimation.

When no frequency component with which the power spectrum exceeding the threshold is present as a result of comparison between the power spectra and the threshold, it can be determined that no interference wave is included. In this case, the interference estimation unit 2001 outputs 0 as the interference frequency range to inform the interference replica generating unit 2002 that no interference is present. When interference is estimated to be included nearly over the entire interference frequency range between $-f_{Sd/2}$ and $+f_{Sd/2}$ the sampling frequency of the null symbols is determined to be insufficient, and the interference frequency range can be used as an evaluation index for performing control to shorten the time domain null insertion interval in the transmission device. When the frequency range in which interference is estimated to be included is smaller than the interference frequency range between $-f_{Sd/2}$ and $+f_{Sd/2}$ the sampling frequency of the null symbols is determined to be excessive, and the interference frequency range can be used as an evaluation index for performing control to enlarge the time domain null insertion interval in the transmission device. When it is determined that no interference is present, the interference frequency range can be used as an evaluation index used to perform control to interrupt insertion of a time domain null in the transmission device. In addition, the estimation of the interference frequency range may be performed at the first time of repetition of processing at which interference components remain largely or performed two or more times from the first time, and a final result of detected interference may be reflected in subsequent repetition of processing.

The interference frequency range estimated by the interference estimation unit 2001 is inputted to the interference replica generating unit 2002. The interference replica generating unit 2002 generates an interference replica using a remaining noise component included in a demodulated signal extracted by the subtraction unit 1902. Specifically, band-limiting filtering is performed according to the interference frequency range estimated by the interference estimation unit 2001 with the interference frequency range being used as a pass band, thereby making it possible to reduce the influence of noise, and effectively extract interference wave components, and generate an interference replica. The time domain conversion unit 2003 converts a frequency domain signal of the interference replica generated by the interference replica generating unit 2002 into a time domain signal. Subsequent processing is similar to the processing in the sixth embodiment.

As described above, the remaining interference component suppressing unit 1803a estimates an interference frequency range, and extracts and suppresses remaining interference components by use of the estimated interference frequency range, thereby making it possible to improve the accuracy of estimation of the interference frequency range with respect to the remaining interference components. This improves the interference suppressing effect, and can reduce deterioration of the reception quality (bit error rate) of a desired wave.

The configurations presented in the embodiments above are examples of the present invention, and can be combined with other publicly known techniques and partially omitted and/or modified without departing from the scope of the present invention.

REFERENCE SIGNS LIST 1, 1a transmission device; 3, 3a, 3b, 3c, 3d, 3e reception device; 100 encoding unit; 101 modulation unit; 102 time null insertion unit; 103, 303 waveform shaping filter unit; 104 D/A conversion unit; 105 transmitting unit; 106 antenna; 200 transmission symbol data; 201 null period; 300 antenna; 301 reception unit; 302 A/D conversion unit; 304, 304a, 304b, 304c, 304d, 304e interference reproduction suppressing unit; 305, 1801 demodulation unit; 306, 1802 decoding unit; 400 null extraction unit; 401, 604 signal interpolation unit; 402, 606 subtraction unit; 500 data symbol; 501 null symbol; 502 interference wave; 503 signal interpolation; 504 interference signal; 600 data symbol extraction unit; 601, 602, 900, 2000 frequency domain conversion unit; 603, 904, 1500, 2001 interference estimation unit; 605, 903, 2003 time domain conversion unit; 700 sampling frequency $f_{Sn}$; 701, 1606, 1703, 2101 power spectrum of interference waves; 702, 802, 1002, 1605, 1702, 2102 power spectrum of noise; 703, 1101, 1607, 2103 threshold; 704, 1102, 2104 lowest frequency in an interference frequency range; 705, 1103, 2105 highest frequency in an interference frequency range; 800, 2100 sampling frequency $f_{Sd}$ of data symbol; 801 power spectrum of data symbol; 901, 1501 weight calculation unit; 902 spectrum flattening unit; 1000, 1600, 1700 sampling frequency $f_S$ of a received signal; 1001, 1701 power spectrum of a received signal; 1003, 1100 flattening weighting factor; 1004, 1705 flattened power spectrum; 1300 frequency null insertion unit; 1400 sampling frequency $f_S$ after insertion of frequency domain nulls; 1401 power spectrum of a transmission signal at time t; 1402 frequency domain null at time t; 1403 power spectrum of a transmission signal at time t+n; 1404 frequency domain null at time t+n; 1601 power spectrum of a received signal at time t; 1602 frequency domain null period at time t; 1603 power spectrum of a received signal at time t+n; 1604 frequency domain null period at time t+n; 1704 flattening weighting factor; 1800 signal selecting unit; 1803, 1803a remaining interference component suppressing unit; 2002 interference replica generating unit; 2200 control circuit; 2200a processor; 2200b memory.

The invention claimed is:

1. A radio communication system comprising:
a transmission device; and
a reception device, wherein
the transmission device includes:
a first null inserter to insert a first signal in a time direction of data symbols, the first signal being a signal having an electric power lower than an amplitude of the data symbols,
the reception device includes:
a null extractor to extract a first symbol from a received signal, the first symbol being a signal in a period corresponding to the first signal;
a signal interpolator to interpolate the first symbol to reproduce interference components in periods corresponding to the data symbols;
a first subtractor to subtract the interference components from the received signal;
a data symbol extractor to extract the data symbols from the received signal; and
a first interference estimator to calculate power spectra of frequency components of the first symbol and the data symbols, and estimate a first interference frequency range using a shape of the power spectra, the first interference frequency range being a frequency range in which the interference components are present, and
the signal interpolator interpolates the first symbol using the first interference frequency range.

2. The radio communication system according to claim 1, wherein the first null inserter periodically inserts the first signal between the data symbols.

3. The radio communication system according to claim 1, wherein
the reception device includes:
a weight calculator to calculate a first weighting factor for flattening a shape of a power spectrum of the received signal in which the first signal is included; and
a spectrum flattener to flatten the power spectrum using the first weighting factor.

4. The radio communication system according to claim 1, wherein
the reception device includes:
a remaining interference component suppressing circuit to suppress a remaining interference component using a demodulation result of demodulation using an output from the first subtractor, a decoding result of decoding the demodulation result, and the first interference frequency range, the remaining interference component being an interference component having failed to be removed by the first subtractor; and
a signal selector to select and output either an output from the first subtractor or an output from the remaining interference component suppressing circuit.

5. The radio communication system according to claim 4, wherein the remaining interference component suppressing circuit includes:
an interference replica generator to perform band limitation using the first interference frequency range and the demodulation result with using the first interference frequency range as a pass band, and generate an interference replica obtained by extracting the interference component;
a weighting factor applying circuit to multiply the interference replica by a second weighting factor for reducing an influence of noise included in the first interference frequency range; and
a second subtractor to subtract the interference replica multiplied by the second weighting factor from the demodulation result.

6. The radio communication system according to claim 4, wherein a process of the remaining interference component suppressing circuit is repeated.

7. The radio communication system according to claim 1, wherein the reception device includes:
a remaining interference component suppressing circuit to suppress a remaining interference component using a demodulation result of demodulation of an output from the first subtractor and a decoding result of decoding the demodulation result, the remaining interference component being an interference component having failed to be removed by the first subtractor; and
a signal selector to select and output either an output from the first subtractor or an output from the remaining interference component suppressing circuit.

8. The radio communication system according to claim 7, wherein
the remaining interference component suppressing circuit includes:
a second interference estimator to detect the remaining interference component using the demodulation result and the decoding result, and estimate a second interference frequency range that is a frequency range in which the remaining interference component is present;
an interference replica generator to perform band limitation using the second interference frequency range and the demodulation result with using the second interference frequency range as a pass band, and generate an interference replica obtained by extracting the remaining interference component;
a weighting factor applying circuit to multiply the interference replica by a second weighting factor for reducing an influence of noise included in the second interference frequency range; and
a second subtractor to subtract the interference replica multiplied by the second weighting factor from the demodulation result.

9. A radio communication system comprising:
a transmission device; and
a reception device, wherein
the transmission device includes:
a first null inserter to insert a first signal in a time direction of data symbols, the first signal being a signal having an electric power lower than an amplitude of the data symbols, and
the reception device includes:
a null extractor to extract a first symbol from a received signal, the first symbol being a signal in a period corresponding to the first signal;
a signal interpolator to interpolate the first symbol to reproduce interference components in periods corresponding to the data symbols;
a first subtractor to subtract the interference components from the received signal;
a weight calculator to calculate a first weighting factor for flattening a shape of a power spectrum of the received signal in which the first signal is included;
a spectrum flattener to flatten the power spectrum using the first weighting factor; and
a first interference estimator to estimate a first interference frequency range using the first weighting factor, the first interference frequency range being a frequency range in which the interference components are present, and
the signal interpolator interpolates the first symbol using the first interference frequency range.

10. The radio communication system according to claim 9, wherein the reception device includes:
a weight calculator to calculate a first weighting factor for flattening a shape of a power spectrum of the received signal in which the first signal is included; and
a spectrum flattener to flatten the power spectrum using the first weighting factor.

11. The radio communication system according to claim 9, wherein the reception device includes:
a remaining interference component suppressing circuit to suppress a remaining interference component using a demodulation result of demodulation using an output from the first subtractor, a decoding result of decoding the demodulation result, and the first interference frequency range, the remaining interference component being an interference component having failed to be removed by the first subtractor; and
a signal selector to select and output either an output from the first subtractor or an output from the remaining interference component suppressing circuit.

12. The radio communication system according to claim 11, wherein the remaining interference component suppressing circuit includes:
an interference replica generator to perform band limitation using the first interference frequency range and the demodulation result with using the first interference frequency range as a pass band, and generate an interference replica obtained by extracting the interference component;
a weighting factor applying circuit to multiply the interference replica by a second weighting factor for reducing an influence of noise included in the first interference frequency range; and
a second subtractor to subtract the interference replica multiplied by the second weighting factor from the demodulation result.

13. The radio communication system according to claim 11, wherein a process of the remaining interference component suppressing circuit is repeated.

14. The radio communication system according to claim 9, wherein the reception device includes:
a remaining interference component suppressing circuit to suppress a remaining interference component using a demodulation result of demodulation of an output from the first subtractor and a decoding result of decoding the demodulation result, the remaining interference component being an interference component having failed to be removed by the first subtractor; and
a signal selector to select and output either an output from the first subtractor or an output from the remaining interference component suppressing circuit.

15. The radio communication system according to claim 14, wherein the remaining interference component suppressing circuit includes:
a second interference estimator to detect the remaining interference component using the demodulation result and the decoding result, and estimate a second interference frequency range that is a frequency range in which the remaining interference component is present;
an interference replica generator to perform band limitation using the second interference frequency range and the demodulation result with using the second interference frequency range as a pass band, and generate an interference replica obtained by extracting the remaining interference component;
a weighting factor applying circuit to multiply the interference replica by a second weighting factor for reducing an influence of noise included in the second interference frequency range; and a second subtractor to subtract the interference replica multiplied by the second weighting factor from the demodulation result.

16. A radio communication system comprising: a transmission device; and a reception device, wherein the transmission device includes:
a first null inserter to insert a first signal in a time direction of data symbols, the first signal being a signal having an electric power lower than an amplitude of the data symbols; and
a second null inserter to insert a second signal in a frequency direction of the data symbols, the second signal being a signal having an electric power value smaller than a power value of the data symbols, the reception device includes:
a null extractor to extract a first symbol from a received signal, the first symbol being a signal in a period corresponding to the first signal;
a signal interpolator to interpolate the first symbol to reproduce interference components in periods corresponding to the data symbols;
a first subtractor to subtract the interference components from the received signal;
a weight calculator to calculate a first weighting factor for flattening a shape of a power spectrum of the received signal in which the first signal and the second signal are included;
a spectrum flattener to flatten the power spectrum using the first weighting factor; and
a first interference estimator to estimate a first interference frequency range using the second signal, the first interference frequency range being a frequency range in which the interference components are present, and the signal interpolator interpolates the first symbol using the first interference frequency range.

17. The radio communication system according to claim 16, wherein the reception device includes:
a remaining interference component suppressing circuit to suppress a remaining interference component using a demodulation result of demodulation using an output from the first subtractor, a decoding result of decoding the demodulation result, and the first interference frequency range, the remaining interference component being an interference component having failed to be removed by the first subtractor; and
a signal selector to select and output either an output from the first subtractor or an output from the remaining interference component suppressing circuit.

18. The radio communication system according to claim 17, wherein the remaining interference component suppressing circuit includes:
an interference replica generator to perform band limitation using the first interference frequency range and the demodulation result with using the first interference frequency range as a pass band, and generate an interference replica obtained by extracting the interference component;
a weighting factor applying circuit to multiply the interference replica by a second weighting factor for reducing an influence of noise included in the first interference frequency range; and
a second subtractor to subtract the interference replica multiplied by the second weighting factor from the demodulation result.

19. The radio communication system according to claim 17, wherein a process of the remaining interference component suppressing circuit is repeated.

20. The radio communication system according to claim 16, wherein the reception device includes:
a remaining interference component suppressing circuit to suppress a remaining interference component using a demodulation result of demodulation of an output from the first subtractor and a decoding result of decoding the demodulation result, the remaining interference component being an interference component having failed to be removed by the first subtractor; and
a signal selector to select and output either an output from the first subtractor or an output from the remaining interference component suppressing circuit.

21. The radio communication system according to claim 20, wherein the remaining interference component suppressing circuit includes:
a second interference estimator to detect the remaining interference component using the demodulation result and the decoding result, and estimate a second interference frequency range that is a frequency range in which the remaining interference component is present;
an interference replica generator to perform band limitation using the second interference frequency range and the demodulation result with using the second interference frequency range as a pass band, and generate an interference replica obtained by extracting the remaining interference component;
a weighting factor applying circuit to multiply the interference replica by a second weighting factor for reducing an influence of noise included in the second interference frequency range; and
a second subtractor to subtract the interference replica multiplied by the second weighting factor from the demodulation result.

22. An interference suppression method for a radio communication system including a transmission device and a reception device, the interference suppression method comprising:
a first step of the transmission device inserting a first signal in a time direction of data symbols, the first signal being a signal having an electric power lower than an amplitude of the data symbols;
a second step of the reception device extracting a first symbol from a received signal, the first symbol being a signal in a period corresponding to the first signal;
a third step of the reception device interpolating the first symbol to reproduce interference components in periods corresponding to the data symbols; and
a fourth step of the reception device subtracting the interference components from the received signal;
a fifth step of the reception device extracting the data symbols from the received signal; and
a sixth step of the reception device calculating power spectra of frequency components of the first symbol and the data symbols, and estimating a first interference frequency range using a shape of the power spectra, the first interference frequency range being a frequency range in which the interference components are present, wherein
in the third step, the reception device interpolates the first symbol using the first interference frequency range.

23. The interference suppression method according to claim 22, wherein in the first step, the first signal is periodically inserted between the data symbols.

24. The interference suppression method according to claim 23, comprising:
- a fourteenth step of the reception device suppressing a remaining interference component using a demodulation result of demodulation of an output of the fourth step and a decoding result of decoding the demodulation result, the remaining interference component being an interference component having failed to be removed in the fourth step; and
- a fifteenth step of the reception device selecting and outputting either the output of the fourth step or an output of the fourteenth step.

25. The interference suppression method according to claim 24, wherein the fourteenth step includes:
- a sixteenth step of the reception device detecting the remaining interference component using the demodulation result and the decoding result, and estimating a second interference frequency range;
- a seventeenth step of the reception device performing band limitation using the second interference frequency range and the demodulation result with using the second interference frequency range as a pass band, and generating an interference replica obtained by extracting the interference component;
- an eighteenth step of the reception device multiplying the interference replica by a second weighting factor for reducing an influence of noise included in the second interference frequency range; and
- a nineteenth step of the reception device subtracting the interference replica multiplied by the second weighting factor from the demodulation result.

26. The interference suppression method according to claim 22, comprising:
- a seventh step of the reception device calculating a first weighting factor for flattening a shape of a power spectrum of the received signal in which the first signal is included; and
- an eighth step of the reception device flattening the power spectrum using the first weighting factor.

27. The interference suppression method according to claim 22, comprising:
- a fourteenth step of the reception device suppressing a remaining interference component using a demodulation result of demodulation of an output of the fourth step, a decoding result of decoding the demodulation result, and the first interference frequency range, the remaining interference component being an interference component having failed to be removed in the fourth step; and
- a fifteenth step of the reception device selecting and outputting either the output of the fourth step or an output of the fourteenth step.

28. The interference suppression method according to claim 27, wherein the fourteenth step includes:
- a sixteenth step of the reception device performing band limitation using the first interference frequency range and the demodulation result with using the first interference frequency range as a pass band, and generating an interference replica obtained by extracting the remaining interference component;
- a seventeenth step of the reception device multiplying the interference replica by a second weighting factor for reducing an influence of noise included in the first interference frequency range; and
- an eighteenth step of subtracting the interference replica multiplied by the second weighting factor from the demodulation result.

29. The interference suppression method according to claim 27, wherein the fourteenth step is repeated.

30. An interference suppression method for a radio communication system including a transmission device and a reception device, the interference suppression method comprising:
- a first step of the transmission device inserting a first signal in a time direction of data symbols, the first signal being a signal having an electric power lower than an amplitude of the data symbols;
- a second step of the reception device extracting a first symbol from a received signal, the first symbol being a signal in a period corresponding to the first signal;
- a third step of the reception device interpolating the first symbol to reproduce interference components in periods corresponding to the data symbols;
- a fourth step of the reception device subtracting the interference components from the received signal;
- a seventh step of the reception device calculating a first weighting factor for flattening a shape of a power spectrum of the received signal in which the first signal is included;
- an eighth step of the reception device flattening the power spectrum using the first weighting factor; and
- a ninth step of the reception device estimating a first interference frequency range using the first weighting factor, the first interference frequency range being a frequency range in which the interference components are present, wherein
in the third step, the reception device interpolates the first symbol using the first interference frequency range.

31. The interference suppression method according to claim 30, comprising:
- a fourteenth step of the reception device suppressing a remaining interference component using a demodulation result of demodulation of an output of the fourth step, a decoding result of decoding the demodulation result, and the first interference frequency range, the remaining interference component being an interference component having failed to be removed in the fourth step; and
- a fifteenth step of the reception device selecting and outputting either the output of the fourth step or an output of the fourteenth step.

32. The interference suppression method according to claim 31, wherein the fourteenth step includes:
- a sixteenth step of the reception device performing band limitation using the first interference frequency range and the demodulation result with using the first interference frequency range as a pass band, and generating an interference replica obtained by extracting the remaining interference component;
- a seventeenth step of the reception device multiplying the interference replica by a second weighting factor for reducing an influence of noise included in the first interference frequency range; and
- an eighteenth step of subtracting the interference replica multiplied by the second weighting factor from the demodulation result.

33. The interference suppression method according to claim 31, wherein the fourteenth step is repeated.

34. The interference suppression method according to claim 30, comprising:
- a fourteenth step of the reception device suppressing a remaining interference component using a demodulation result of demodulation of an output of the fourth step and a decoding result of decoding the demodulation result, the remaining interference component being an interference component having failed to be removed in the fourth step; and a fifteenth step of the reception device selecting and outputting either the output of the fourth step or an output of the fourteenth step.

35. The interference suppression method according to claim 34, wherein the fourteenth step includes:
   a sixteenth step of the reception device detecting the remaining interference component using the demodulation result and the decoding result, and estimating a second interference frequency range;
   a seventeenth step of the reception device performing band limitation using the second interference frequency range and the demodulation result with using the second interference frequency range as a pass band, and generating an interference replica obtained by extracting the interference component;
   an eighteenth step of the reception device multiplying the interference replica by a second weighting factor for reducing an influence of noise included in the second interference frequency range; and
   a nineteenth step of the reception device subtracting the interference replica multiplied by the second weighting factor from the demodulation result.

36. An interference suppression method for a radio communication system including a transmission device and a reception device, the interference suppression method comprising:
   a first step of the transmission device inserting a first signal in a time direction of data symbols, the first signal being a signal having an electric power lower than an amplitude of the data symbols;
   a second step of the reception device extracting a first symbol from a received signal, the first symbol being a signal in a period corresponding to the first signal;
   a third step of the reception device interpolating the first symbol to reproduce interference components in periods corresponding to the data symbols;
   a fourth step of the reception device subtracting the interference components from the received signal;
   a tenth step of the transmission device inserting a second signal in a frequency direction of the data symbols, the second signal being a signal having an electric power value smaller than a power value of the data symbols;
   an eleventh step of the reception device calculating a first weighting factor for flattening a shape of a power spectrum of the received signal in which the first signal and the second signal are included;
   a twelfth step of the reception device flattening the power spectrum using the first weighting factor; and
   a thirteenth step of the reception device estimating a first interference frequency range using the second signal, the first interference frequency range being a frequency range in which the interference components are present, wherein
   in the third step, the reception device interpolates the first symbol using the first interference frequency range.

37. The interference suppression method according to claim 36, comprising:
   a fourteenth step of the reception device suppressing a remaining interference component using a demodulation result of demodulation of an output of the fourth step, a decoding result of decoding the demodulation result, and the first interference frequency range, the remaining interference component being an interference component having failed to be removed in the fourth step; and
   a fifteenth step of the reception device selecting and outputting either the output of the fourth step or an output of the fourteenth step.

38. The interference suppression method according to claim 37, wherein the fourteenth step includes:
   a sixteenth step of the reception device performing band limitation using the first interference frequency range and the demodulation result with using the first interference frequency range as a pass band, and generating an interference replica obtained by extracting the remaining interference component;
   a seventeenth step of the reception device multiplying the interference replica by a second weighting factor for reducing an influence of noise included in the first interference frequency range; and
   an eighteenth step of subtracting the interference replica multiplied by the second weighting factor from the demodulation result.

39. The interference suppression method according to claim 37, wherein the fourteenth step is repeated.

40. The interference suppression method according to claim 36, comprising:
   a fourteenth step of the reception device suppressing a remaining interference component using a demodulation result of demodulation of an output of the fourth step and a decoding result of decoding the demodulation result, the remaining interference component being an interference component having failed to be removed in the fourth step; and
   a fifteenth step of the reception device selecting and outputting either the output of the fourth step or an output of the fourteenth step.

41. The interference suppression method according to claim 40, wherein the fourteenth step includes:
   a sixteenth step of the reception device detecting the remaining interference component using the demodulation result and the decoding result, and estimating a second interference frequency range;
   a seventeenth step of the reception device performing band limitation using the second interference frequency range and the demodulation result with using the second interference frequency range as a pass band, and generating an interference replica obtained by extracting the interference component;
   an eighteenth step of the reception device multiplying the interference replica by a second weighting factor for reducing an influence of noise included in the second interference frequency range; and
   a nineteenth step of the reception device subtracting the interference replica multiplied by the second weighting factor from the demodulation result.

42. A control circuit for a reception device receiving a signal in which a first signal is inserted in a time direction of data symbols, the first signal being a signal having an electric power lower than an amplitude of the data symbols, wherein
   the control circuit causes the reception device to execute:
   a first step of extracting a first symbol from a received signal, the first symbol being a signal in a period corresponding to the first signal;
   a second step of interpolating the first symbol to reproduce interference components in periods corresponding to the data symbols;

a third step of subtracting the interference components from the received signal;

a fourth step of extracting the data symbols from the received signal; and a fifth step of calculating power spectra of frequency components of the first symbol and the data symbols, and estimating a first interference frequency range using a shape of the power spectra, the first interference frequency range being a frequency range in which the interference components are present, and in the second step, the first symbol is interpolated using the first interference frequency range.

43. A non-transitory program storage medium storing a program configured to control a reception device receiving a signal in which a first signal is inserted in a time direction of data symbols, the first signal being a signal having an electric power lower than an amplitude of the data symbols, wherein the program causes the reception device to execute:

a first step of extracting a first symbol from a received signal, the first symbol being a signal in a period corresponding to the first signal;

a second step of interpolating the first symbol to reproduce interference components in periods corresponding to the data symbols;

a third step of subtracting the interference components from the received signal;

a fourth step of extracting the data symbols from the received signal; and a fifth step of calculating power spectra of frequency components of the first symbol and the data symbols, and estimating a first interference frequency range using a shape of the power spectra, the first interference frequency range being a frequency range in which the interference components are present, and in the second step, the first symbol is interpolated using the first interference frequency range.

* * * * *